(12) United States Patent
Naylor et al.

(10) Patent No.: US 12,407,625 B2
(45) Date of Patent: Sep. 2, 2025

(54) IT INFRASTRUCTURE RESOURCE DISCOVERY AND MANAGEMENT FOR DISTRIBUTED NETWORKING

(71) Applicant: Cloudflare, Inc., San Francisco, CA (US)

(72) Inventors: David Naylor, Berkeley, CA (US); Eric Carino, Milpitas, CA (US); Matthew Mukerjee, Colchester, VT (US); Ryan Standt, Emeryville, CA (US); Michael Tovino, Hood River, OR (US); Meigy Tsai, Sunnyvale, CA (US); Stephen Welham, Woodinville, WA (US)

(73) Assignee: Cloudflare, Inc., San Francisco, CA (US)

( * ) Notice: Subject to any disclaimer, the term of this patent is extended or adjusted under 35 U.S.C. 154(b) by 1 day.

(21) Appl. No.: 18/597,234

(22) Filed: Mar. 6, 2024

(65) Prior Publication Data

US 2024/0305583 A1   Sep. 12, 2024

Related U.S. Application Data

(60) Provisional application No. 63/489,149, filed on Mar. 8, 2023.

(51) Int. Cl.
*H04L 47/78* (2022.01)
*H04L 9/40* (2022.01)
*H04L 41/082* (2022.01)
*H04L 47/70* (2022.01)

(52) U.S. Cl.
CPC .......... *H04L 47/781* (2013.01); *H04L 41/082* (2013.01); *H04L 47/829* (2013.01); *H04L 63/083* (2013.01)

(58) Field of Classification Search
CPC ... H04L 47/781; H04L 47/829; H04L 41/082; H04L 63/083
USPC ........................................................ 709/226
See application file for complete search history.

(56) References Cited

U.S. PATENT DOCUMENTS

| 8,966,039 B1* | 2/2015 | Fultz ................... G06F 11/3055 709/224 |
| 12,001,837 B2* | 6/2024 | Wigglesworth .......... G06F 8/35 |
| 2008/0049614 A1* | 2/2008 | Briscoe ............... H04L 41/0896 370/230 |

(Continued)

*Primary Examiner* — Ruolei Zong
(74) *Attorney, Agent, or Firm* — MLO, a professional corp.

(57) ABSTRACT

A method involves receiving, at a Global Resource Catalog (GRC) controller, credentials for one or more target networks within a distributed cloud network. For each target network, the GRC controller uses a respective network access methodology associated with that target network to identify and store a first set of target network resources associated with that network at a GRC database. The GRC controller links or groups a second set of target network resources of the first set of target network resources in the GRC database based on target network resource dependencies determined by the GRC controller. The GRC controller updates the second set of target network resources in the GRC database based on a received event or at a scheduled interval. A distributed cloud network is then updated based on the second set of target network resources stored at the GRC database.

20 Claims, 19 Drawing Sheets

(56) References Cited

U.S. PATENT DOCUMENTS

2016/0142268 A1* 5/2016 Alatorre ............... G06F 16/119
　　　　　　　　　　　　　　　　　　　　　709/226
2019/0394658 A1* 12/2019 Baillargeon ........ H04L 41/0895

* cited by examiner

802

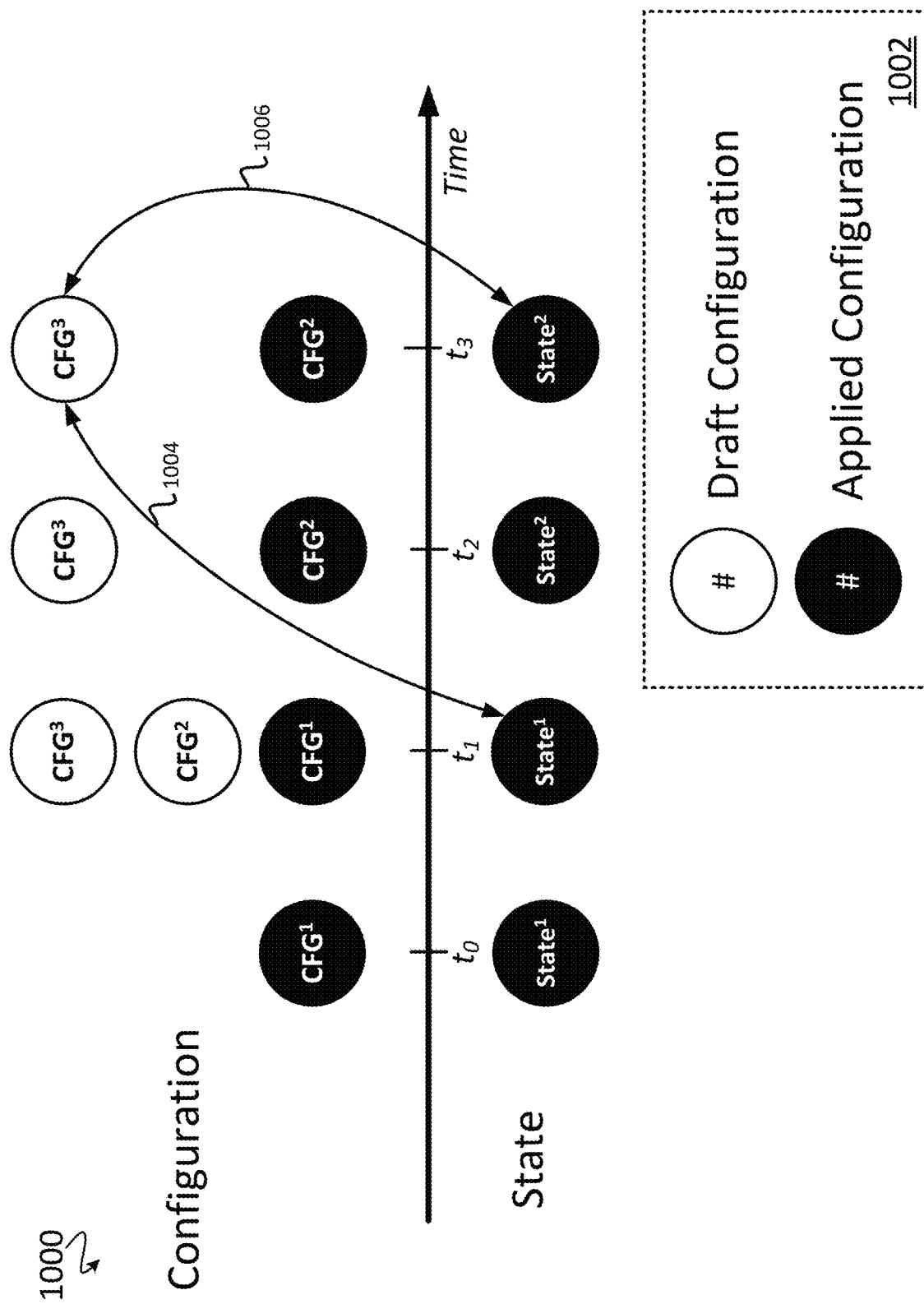

IT INFRASTRUCTURE RESOURCE DISCOVERY AND MANAGEMENT FOR DISTRIBUTED NETWORKING

RELATED APPLICATIONS

This application claims priority to U.S. Provisional Patent Application No. 63/489,149, filed Mar. 8, 2023, all of which is incorporated herein by reference for all purposes.

BACKGROUND

Cloud computing involves a variety of technologies and methods to virtualize physical computer resources and applications. One aspect of cloud computing is Infrastructure-as-a-Service (IaaS), which leverages geographically distributed compute nodes, such as servers, for IT infrastructure implementation. This infrastructure, including computer networks, utilizes virtual hardware resources like virtualized networks, virtual machines, and virtualized storage.

Cloud service providers offer means for establishing virtualized network connectivity among physical or virtualized compute resources which may span multiple regions within one provider, may span multiple providers, and may also span multiple "on-premise" sites (such as private offices or data centers). Such cloud service providers include AMAZON WEB SERVICES, GOOGLE CLOUD PLATFORM, and MICROSOFT AZURE.

The basic unit of networking in cloud computing is a group of compute instances connected by a logically isolated local network—the cloud equivalent of a traditional on-premise local area network. Some cloud service providers refer to such groups of compute instances as virtual private clouds (VPCs), while other cloud service providers refer to such groups of compute instances as virtual networks (VNets). VPCs and VNets are generically referred to herein as networks. Additionally, some cloud network resources act as containers for other cloud resources. For example, a resource group may contain multiple network resources which are provisioned and managed together.

SUMMARY

In some aspects, the techniques described herein relate to a method, including: receiving, at a Global Resource Catalog (GRC) controller, credentials for one or more target networks within a distributed cloud network; for each target network, using, by the GRC controller, a respective network access methodology associated with that target network to identify and store a first set of target network resources associated with that network at a GRC database; linking or grouping, by the GRC controller, a second set of target network resources of the first set of target network resources in the GRC database based on target network resource dependencies determined by the GRC controller; updating, by the GRC controller, the second set of target network resources in the GRC database based on a received event or at a scheduled interval; and updating the distributed cloud network based on the second set of target network resources stored at the GRC database.

In some aspects, the techniques described herein relate to a non-transitory computer-readable medium storing instructions for executing a computer-implemented method, the computer-implemented method including: receiving, at a Global Resource Catalog (GRC) controller, credentials for one or more target networks within a distributed cloud network; for each target network, using, by the GRC controller, a respective network access methodology associated with that target network to identify and store a first set of target network resources associated with that network at a GRC database; linking or grouping, by the GRC controller, a second set of target network resources of the first set of target network resources in the GRC database based on target network resource dependencies determined by the GRC controller; updating, by the GRC controller, the second set of target network resources in the GRC database based on a received event or at a scheduled interval; and updating the distributed cloud network based on the second set of target network resources stored at the GRC database.

In some aspects, the techniques described herein relate to a method, including: identifying, at a Global Resource Catalog (GRC) controller, a GRC database that includes data associated with a first set of target network resources of a distributed cloud network; and linking or grouping, by the GRC controller, a second set of target network resources within the first set of target network resources based on target network resource dependencies determined by the GRC controller, the linking including: for each first target network resource of the first set of target network resources: identifying, by the GRC controller, a set of properties for the first target network resource; and for each remaining second target network resource in the first set of target network resources: identifying, by the GRC controller, a set of properties for the second target network resource; comparing, by the GRC controller, each first property of the first target network resource to each second property of the second network resource; upon determining, by the GRC controller, that a potential link is defined in the GRC database between the first property and the second property, determining, by the GRC controller, whether one or more first values of the first property match one or more second values of the second property; and upon determining that the one or more first values match one or more second values, annotating, in the GRC database, the first property with an identifier of the second property, and annotating, in the GRC database, the second property with an identifier of the first property; and updating the distributed cloud network based on the second set of target network resources stored at the GRC database.

BRIEF DESCRIPTION OF THE DRAWINGS

FIGS. 10A-B illustrate a simplified example of changes to a network configuration and state over time, in accordance with some embodiments.

DETAILED DESCRIPTION

The practice of using multiple public cloud service providers simultaneously (multi-cloud) is increasingly common. Spreading IT infrastructure resources ("network resources") across multiple providers allows companies to avoid vendor lock-in, improve redundancy, and use different cloud networks for different services based on differences in cost or feature sets.

However, these benefits come with an increased management and monitoring burden. In particular, for an organization, keeping track of "what you have and where" is difficult because there is no single portal that an administrator can use to list all of the cloud resources that are under their management. Indeed, this problem exists even within individual cloud networks in that providers often do not implement a convenient way for administrators to see all of an organization's cloud resources in one place.

Additionally, conventional IT infrastructure management applications are often limited to cataloging and displaying network resources associated with one provider account—even though it is common for an organization to have dozens, or even hundreds of accounts with the same provider (e.g., for different teams, projects, or as a result of a merger or acquisition). Even within a provider account portal, a user is often limited to browsing between feature-specific parts of a user interface to see network resources related to that feature. For example, a conventional IT infrastructure management application may include a VPC section that catalogs and displays all of the networks associated with the account, a compute section that catalogs and displays all of the VMs associated with the account, and so on.

Still additionally, conventional IT infrastructure management applications do not provide cross-cloud "linkability". That is, some IT infrastructure ("network") resources reference other network resources using links. For instance, a firewall rule might allow traffic from a certain group of virtual machines (VMs) and not others. These references may be explicit (e.g., the rule's target is "VM group X") or implicit (e.g., the rule's target is a list of the literal IP addresses belonging to those VMs, without any context indicating to which VMs they belong). In many situations, explicit references are preferred over implicit references because (1) they are human-readable (i.e., it may not be apparent at a glance that a list of IP addresses is of group X), and (2) they automatically update as resources change. For example, if a VM's IP address changes, a firewall's rule list of IP addresses does not need to be manually updated. Unfortunately, explicit references are not conventionally possible across cloud networks, since one cloud network is not typically aware of an organization's resources in another cloud network and are sometimes not available within even a single cloud network because the provider chooses not to support them.

Figure 1:
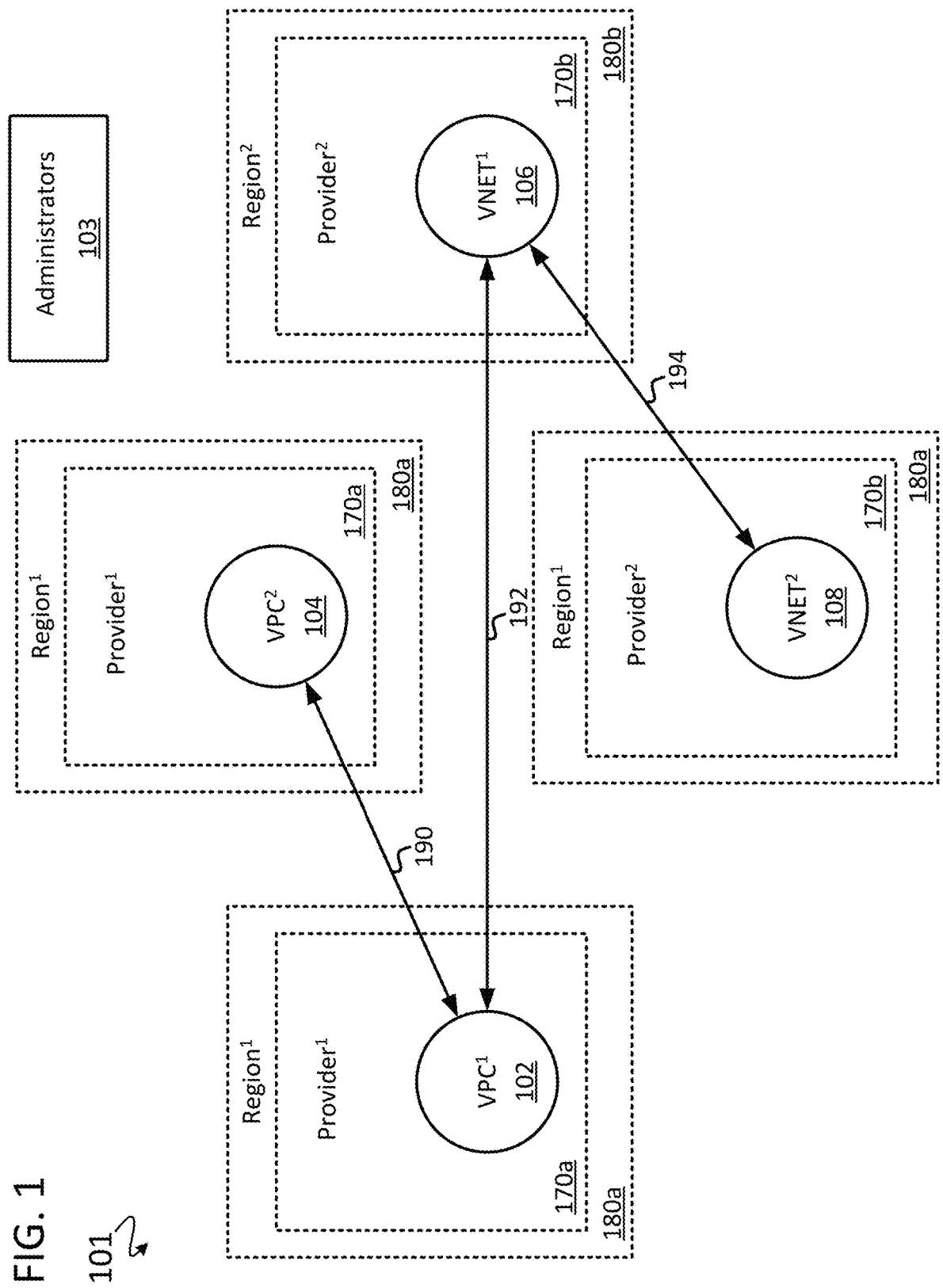
FIG. 1 shows a simplified example of a distributed cloud network, in accordance with some embodiments.

To elaborate, FIG. 1 shows a simplified example of a distributed cloud network ("network") 101 that is implemented within an IT infrastructure, in accordance with some embodiments. In the example shown, an organization has established a multi-cloud strategy using the network 101 by engaging with various cloud service providers 170a-b to architect and manage a distributed cloud network infrastructure. The simplified example network 101 includes a first logically isolated local network VPC[1] ("network") 102, a second logically isolated local network VPC[2] ("network") 104, a third logically isolated local network VNET[1] ("network") 106, a fourth logically isolated local network VNET[2] ("network") 108, and network connections (representing routing reachability) 190, 192, and 194. The network 102 and the network 104 are both operated using a first cloud-networking Provider[1] 170a within a first geographic Region[1] 180a, the network 106 is operated using a second cloud-networking Provider[2] 170b within a second geographic Region[2] 180b, and the network 108 is operated using the second Provider[2] 170b within the first geographic Region[1] 180a.

One or more administrators 103 associated with the organization that deployed or are simply managing the network 101 may be responsible for planning, provisioning, and maintaining that network. However, as mentioned above, global knowledge of past, current, and planned deployments of network resources within the network 101 and linkages therebetween is difficult to assemble using conventional solutions.

Disclosed herein are a Global Resource Catalog (GRC) database and an associated Global Resource Catalog (GRC) controller which advantageously enable the administrators 103 to manage IT infrastructure, including on-premise, self-hosted resources, cloud networks distributed across multiple providers and multiple regions, data centers, virtualization environments, software and management tools, security infrastructure, communication systems, and so on. The GRC controller holds credentials to access each of an organization's public cloud network accounts to build a global list, i.e., a Global Resource Catalog, of that organization's cloud resources across all providers. Thereafter, a user, such as one or more of the administrators 103, may use the Global Resource Catalog database to holistically view, modify, remove, and create network resources, configurations, connections, linkages, and groupings, among other parameters, for managing a distributed cloud network.

Figure 2:
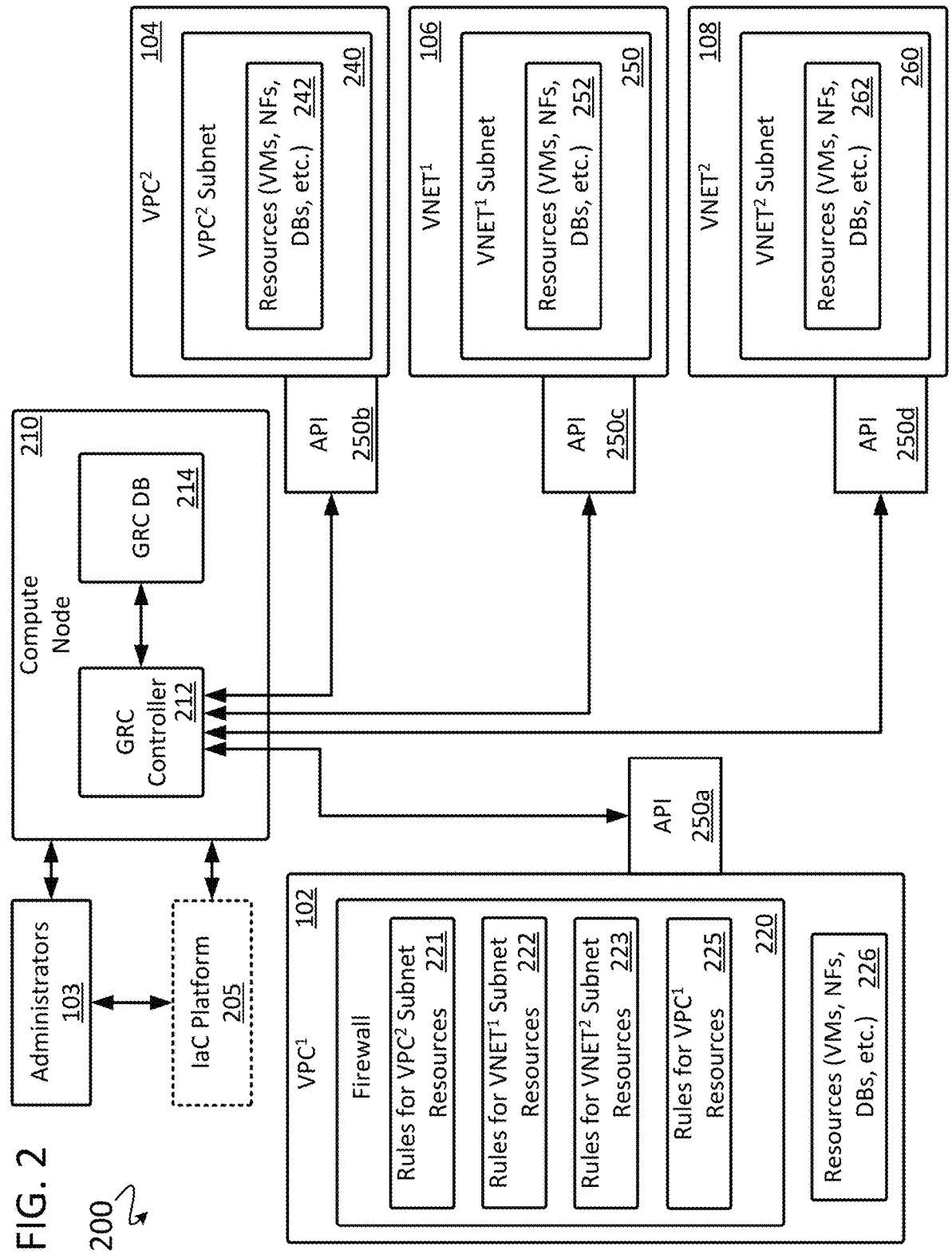
FIG. 2 provides a simplified diagram of an example Global Resource Catalog (GRC) controller and GRC database used for cataloging and managing the network introduced in FIG. 1, in accordance with some embodiments.

FIG. 2 provides a simplified diagram 200 of an example GRC controller, an example GRC database, and the network 101 introduced in FIG. 1, in accordance with some embodiments. The GRC controller and the GRC database are used to manage the network 101. FIG. 2 includes the networks 102, 104, 106, 108, and the administrators 103 introduced in FIG. 1, as well as a global resource catalog (GRC) controller 212, and a GRC database ("DB") 214 at one or more compute nodes 210. Also shown is an optional Infrastructure as Code (IaC) IT infrastructure management application ("IaC Platform") 205 communicatively coupled to the administrators 103, the GRC controller 212, and the GRC database 214.

The network resources 226, 242, 252, and 262 may include computing resources such as virtual machines, and containers, storage resources such as file storage, block storage, object storage, and database resources, networking resources such as virtual network gateways, load balancers, and virtual private networks, and application services such as web apps, and content delivery networks, among other network resources.

The VPC[1] network 102 includes a firewall 220, and other VPC[1] network resources 226. Similarly, the VPC[2] network 104 includes a VPC[2] subnet 240 having network resources 242, the VNET[1] network 106 includes a VNET[1] subnet 250 having network resources 252, and the VNET[2] network 108 includes a VNET[2] subnet 260 having network resources 262.

The firewall 220 provisioned at the network 102 is configured to manage network traffic associated with the cross-cloud networks 104, 106, and 108. As such, the firewall 220 includes firewall rules 221 for traffic associated with the network resources 242 of the $VPC^2$ subnet 240, firewall rules 222 for traffic associated with the network resources 252 of the $VNET^1$ subnet 250, firewall rules 223 for traffic associated with the network resources 262 of the $VNET^2$ subnet 260, and local firewall rules 225 for traffic associated with the network resources 226 of the $VPC^1$ network 102.

The providers 170a-b for the networks 102, 104, 106, and 108 expose at least one Application Programming Interface (API), respectively 250a-d, that is optionally managed by an API Gateway or API Management service thereof (not shown). The APIs 250a-d are conventionally accessible via endpoints or an IaC interface and enable a wide range of operations, including querying for provisioned network resources and their configurations.

As described in greater detail below, the GRC controller 212 is operable to communicate with each of the APIs 250a-d, as well as with the GRC database 214. The GRC controller 212 may implement an IaC IT infrastructure management application for managing the network 101 or may communicate with and/or receive commands from the IaC IT infrastructure management application 205 to assist in managing the network 101.

Infrastructure as Code (IaC) is an IT practice that involves managing and provisioning programmable computing infrastructure through machine-readable definition files, rather than through physical hardware configuration or interactive configuration tools. This approach enables the automation of IT infrastructure deployment and management, ensuring consistency and efficiency in the creation and maintenance of IT resources. In the context of cloud computing, IaC can be leveraged to programmatically define and manage a wide array of network resources, such as servers, storage systems, networks, and virtual machines, using scripts or declarative definition files. Utilizing IaC, it is possible to define and/or extract detailed configuration data for each identified network resource by executing scripts or commands that interact with the cloud service provider's API, querying the current state of the infrastructure as defined in the code.

For example, a user may issue a "plan" command to a conventional IaC IT infrastructure management application (providing a specification as an input). This command causes the conventional IaC IT infrastructure management application to review the provided specification and issue API calls to a corresponding provider to query the most recent state of each network resource in the specification.

However, conventional IaC IT infrastructure management applications do not discover and show linkages and dependencies between distributed network resources for network topologies that were initially created without using the conventional IaC IT infrastructure management application and/or for distributed network resources that have been modified out-of-band (i.e., without using the conventional IaC IT infrastructure management application). That is to say, conventional IaC IT infrastructure management applications will not discover linkages for pre-existing network resources and will not keep such linkages up-to-date if the network resources are changed out-of-band.

This is because conventional IaC IT infrastructure management applications assume that they are managing resources that they created from scratch in the past (i.e., a user wrote a new specification describing new network resources, and the IaC IT infrastructure management application subsequently provisioned the new network resources). As such, there is limited "import" functionality, whereby conventional IaC IT infrastructure management applications can discover pre-existing network resources. Such limited import functionality often requires that a user provide the IaC IT infrastructure management application with a list of pre-existing network resource IDs as input. In either case, once the conventional IaC IT infrastructure management application knows the list of resource IDs (because it created the resources or because a user provided a list of network resource IDs as input), the conventional IaC IT infrastructure management application will automatically retrieve the latest configuration state for those resources. The conventional IaC IT infrastructure management application then uses that state to compare against the latest configuration described in the user's specification in order to decide if any modifications are necessary to bring the resources in line with the specification.

As described above, the network 101 shown in FIG. 1 and further described in FIG. 2 may present several management challenges for the administrators 103 if they are using a conventional IaC IT infrastructure management application. For example, the network resources 220, 226, 242, 252, and 262 are distributed across multiple networks 102, 104, 106, and 108, which are themselves distributed across multiple regions 180a-b and implemented using multiple providers 170a-b. Achieving up-to-date knowledge of "which network resources are provisioned and where" within the network 101 presents a significant challenge for the administrators 103 and/or the IaC IT infrastructure management application 205.

Additionally, because the network resources are distributed across multiple networks and multiple network providers, linkages between the network resources may not be readily available to the administrators 103 and/or the IaC IT infrastructure management application 205. For example, as shown in FIG. 2, the firewall 220 provisioned in the network 102 includes rules 221, 222, and 223 associated with network traffic for the network resources 242, 252, and 262 provisioned in the networks 104, 106, 108. Conventional network management tools, including IaC applications, may either not make such linkages apparent, or may easily become out of sync when updates are made to any of the networks 104, 106, and 108.

Still yet additionally, the deployment and configurations of the network resources within the network 101 may change over time and in some cases may occur "out-of-band". Out-of-band changes refer to modifications or alterations that are made directly to an element or attribute of the network 101 without using the standard, predefined management tools or procedures such as the GRC controller 212 or the IaC IT infrastructure management application 205.

The GRC database 214 and associated GRC controller 212 advantageously enable the administrators 103 to manage complex cloud networks distributed across multiple providers and multiple regions. As disclosed herein, in some embodiments, the GRC controller 212 possesses credentials to access each of an organization's public cloud network accounts to build a global list, i.e., a Global Resource Catalog database 214, of that organization's cloud resources across all providers.

In some embodiments, the GRC controller 212 provides a portal (e.g., a user interface), which enables a user such as the administrators 103 to view all network resources in one application environment. The portal may support convenient features like sorting, searching, and filtering. When coupled with a cloud management tool (i.e., a tool that can monitor and modify cloud resources, such as the IaC IT infrastructure management application 205), the GRC database 214 enables the display and management of explicit links across cloud networks, display and management of explicit links within cloud networks, and the creation and management of dynamic network resource groups.

In an example of explicit links across cloud networks, the administrators 103 may use the GRC controller 212 to create the firewall rules 221 for the firewall 220 in the network 102 that reference the network resources 242 in the VPC$^2$ subnet 240. This ability is due to the GRC controller 212 being aware of both of the networks 102, 104 and the associated network resources therein and can therefore keep the firewall rules up-to-date if there is an IP address change for one or more of the network resources 242.

The GRC controller 212 may additionally create and manage explicit links within each of the networks 102, 104, 106, and/or 108 where such linking is not natively supported by the respective provider. For example, in some cloud networks, firewall rules can only target single IP addresses or subnets, i.e., an administrator cannot specify an entire VPC (which might include many subnets) as a target. The GRC controller 212 and associated GRC database 214 advantageously enable such linking.

The GRC controller 212 may also create and manage dynamic resource groups. In such embodiments, the GRC controller 212 may be accessed and controlled by the administrators 103 or by another cloud networking management tool, such as the IaC IT infrastructure management application 205, using a global resource catalog query language (GRCQL) to define dynamic groups of network resources within the GRC database 214 on-the-fly.

For example, the administrators 103 may create a firewall rule for the firewall 220 targeting "all VMs in the region US-West with the tag 'Production'", even if the providers 170a-b do not support grouping in that way, or even if the VMs are spread across multiple networks and providers.

Such GRCQL queries may also be used to implement advanced filtering within the GRC database 214. A first example of a filtering operation may involve using flexible queries to look for old, forgotten, or unused resources that an organization is paying for, but is no longer using. For example, the administrators may provide a GRCQL query equivalent to "show all VMs that have had CPU utilization under 10% in the last 3 months", or "show all resources whose configurations haven't been modified in a year". A second example filtering operation may involve using flexible GRCQL queries to discover potential configuration mistakes, e.g., "show all VMs with tag 'internal' that have public IP addresses".

Figure 3A:
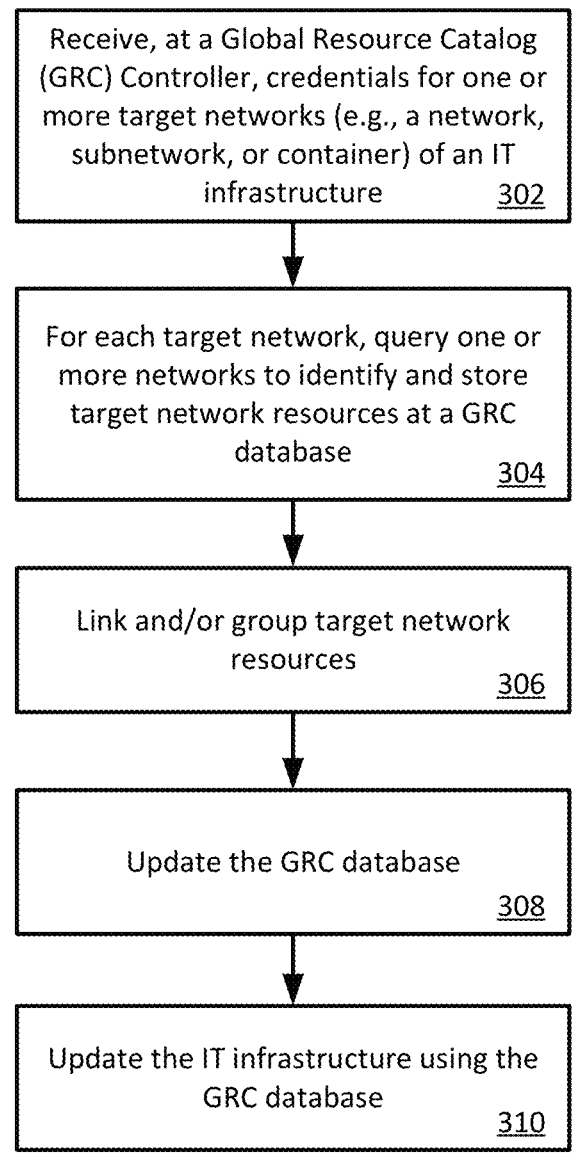
FIG. 3A illustrates a first high-level example process for generating and managing a GRC database, in accordance with some embodiments.

FIG. 3A illustrates a first high-level example process 300 for generating and managing a Global Resource Catalog database, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 302 (with reference to FIG. 2), the GRC controller 212 receives (e.g., from the administrators 103 or the IaC IT infrastructure management application 205) credentials for one or more target networks of an IT infrastructure. Such credentials may include any information needed by the GRC controller 212 to establish a communication channel with the networks 102, 104, 106, and 108 and/or the APIs 250a-d so that the GRC controller 212 may send commands and requests thereto to receive network resource identifiers and configuration data using an API command and control methodology and/or an IaC command and control methodology.

In some embodiments, the IT infrastructure may implement, or may include, a distributed cloud network such as the network 101. In this context, a target network is generally any network resource that is "network-like" or "container-like". That is, some network resources act as containers for other network resources. For example, VPCs and VNETs are network-like but also container-like in that they serve as containers for other network resources. By comparison, AZURE Resource Groups are not necessarily network-like, but they too serve as containers for other network resources. To simplify the description herein, a target network may refer to either or both of network-like resources and container-like resources.

The use of the phrase "target" herein is taken to mean "of interest" to the administrators 103 at a given time, within the scope of a current project, for a current update, at a current planning phase, etc. As such, a "target" network, a "target" network resource, "target" configuration data, and so on, are respective elements that may be of a subset of the totality of elements that exist within a given IT infrastructure. However, in some scenarios, the target networks may include all of the networks that exist within a given IT infrastructure. Similarly, in some scenarios, the target network elements may include all of the network resources that exist within the given IT infrastructure. In some embodiments, the target networks referred to at step 302 are the networks that correspond to any network credentials received by the GRC controller from the administrators 103 (thereby identifying those networks as target networks).

At step 304, for each identified target network, the GRC controller 212 queries one or more networks (e.g., using an IaC methodology and/or the APIs 250a-d) to identify and store a set of target network resources (e.g., the network resources 220, 226, 242, 252, and 262) at the GRC database 214.

In some embodiments, a target network resource is any IT infrastructure component that is associated with the one or more target networks identified at step 302. In other embodiments, the administrators 103 may indicate to the GRC controller 212 that only a particular type of network resource, class of network resource, and/or network resources having a particular parameter are of interest and are therefore target network resources. In such embodiments, the target network resources include a subset of the total network resources associated with the identified target networks. Details of step 304 are described in detail below with reference to FIGS. 4-5.

The phrase "stored" in the context of a network resource being "stored" at the GRC database 214 is taken to mean that a data representation of the network resource is saved within the GRC database 214. The data representation for a network resource may include, but is not limited to, network resource IDs, associated current and past configuration data, associated current and past state data, associated parameters, associated annotations, associated IaC data objects, and so on.

At step 306, the GRC controller 212 groups and links relevant target network resources in the GRC database 214 based on identified or discovered target network resource dependencies. In some scenarios, the network resources grouped or linked at step 306 may be a subset of the target network resources that were identified at step 304. For example, if a first set of network resources were identified at step 304 that represented every network resource within an IT infrastructure, the network resources grouped or linked at step 306 may represent just the network resources of a particular target subnet of the IT infrastructure as identified by the administrators 103 or the IaC IT infrastructure management application 205. Details of step 306 are described below with reference to FIG. 6-7.

At step 308, the GRC controller 212 updates the GRC database 214 periodically or based on a detected event. Because network resources may change outside of the control of the GRC controller 212, ("out-of-band changes"), the GRC database 214 should be refreshed to stay up to date with a current state of the associated network. Details of step 308 are shown and described below with reference to FIG. 9.

In some embodiments, in addition to storing a data representation and associated configuration data for each target network resource at the GRC database 214, the GRC controller 212 additionally stores a state history of all, or a subset, of previous versions for each target network resource's configuration data, connections, dependencies, groupings, linkages, and other parameters.

In some embodiments, the GRC controller 212 updates the GRC database 214 at step 308 by polling the target networks and/or target network resources at a scheduled interval. In such embodiments, the GRC controller 212 runs a background process that periodically (e.g., once every ten minutes, or at another appropriate interval) wakes up and repeats all or a portion of the same process used to construct the GRC database 214 initially (i.e., steps 302-306). Upon completion, for each target network resource, the GRC controller 212 compares an updated configuration for each target network resource to a most recent configuration stored at the GRC database 214. If the configurations differ, the GRC controller 212 adds the updated configuration for that target network resource to the GRC database 214.

In other embodiments, the GRC controller 212 updates the GRC database 214 at step 308 using an event subscription interface if a given provider offers the ability to subscribe to a stream of "resource update" events. In such embodiments, there is advantageously no need to waste CPU time of the GRC controller 212 by polling for target network resources that may not have changed. Additionally, some providers may rate-limit how frequently an application can poll their APIs, which thereby limits how up-to-date the GRC database 214 may be kept by the GRC controller 212. Subscribing to event updates avoids this problem.

Upon receiving a notification from the given provider, the GRC controller 212 may retrieve and process the updated target network configuration data. As described above, the GRC controller 212 compares an updated configuration for each target network resource to a most recent configuration stored at the GRC database 214. If the configurations differ, the GRC controller 212 adds the updated configuration for that target network resource to the GRC database 214.

At step 310 the administrators 103 and/or the IaC IT infrastructure management application 205 may make updates to the one or more target networks, advantageously using network resource links, grouping, configuration data, and historical state data stored at the GRC database 214. In some embodiments, the GRC controller 212 provides (e.g., to the administrators 103), a user interface to display, monitor, and modify the network resources associated with the GRC database 214. In such embodiments, the GRC controller 212 implements all or a portion of an IaC IT infrastructure management application. Examples of modifications that the GRC controller 212 may make, in addition to modifications that a conventional IaC IT infrastructure management application is operable to perform, include modifications to the network resources, modifications to groupings of the network resources, modifications to rules and parameters of the networking resources, and modifications to connections between the networking resources, among other modifications.

In some embodiments, the GRC controller 212 provides an API interface to the IaC IT infrastructure management application 205, which may similarly use the GRC controller 212 and/or the GRC database 214 to make such modifications.

Figure 3B:
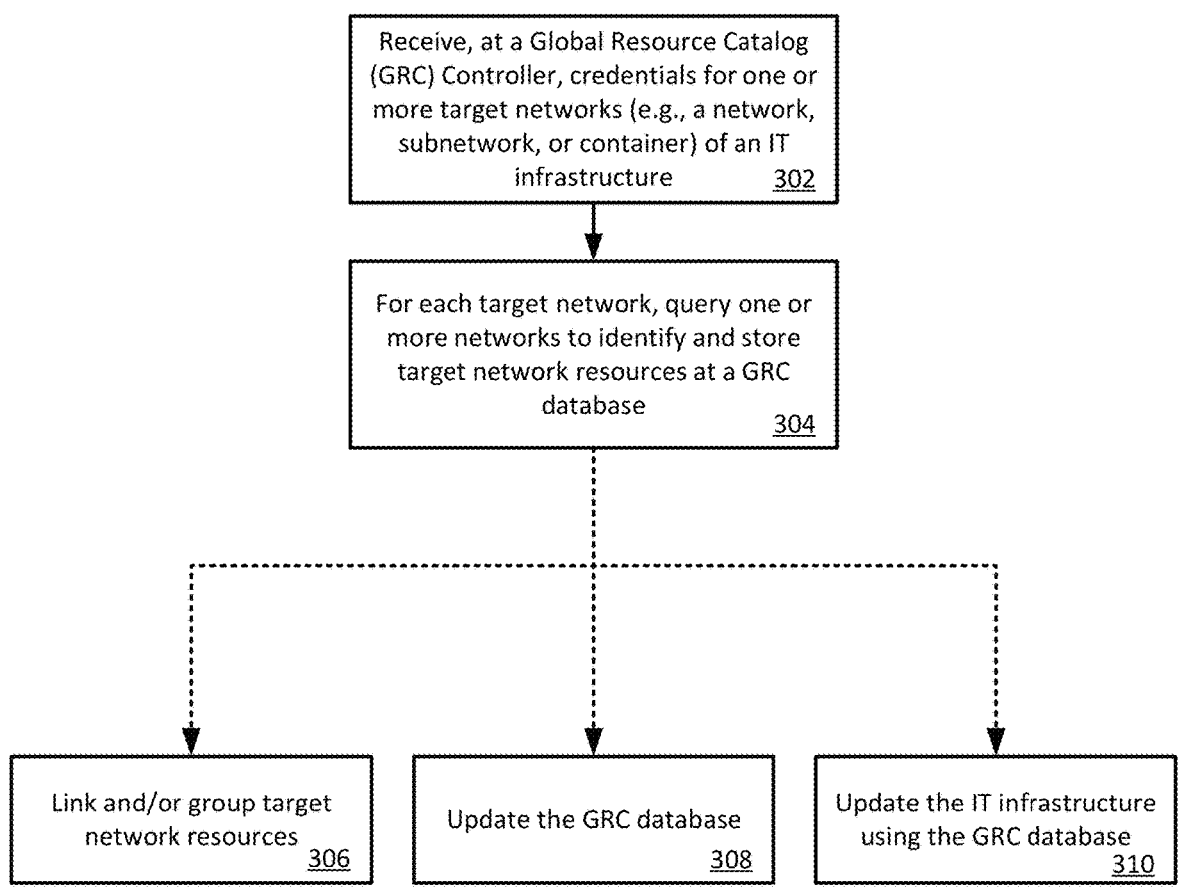
FIG. 3B illustrates a second high-level example process for generating and managing a GRC database, in accordance with some embodiments.

FIG. 3B illustrates a second high-level example process 350 for generating and managing a Global Resource Catalog database, in accordance with some embodiments. The particular steps, order of steps, and combination of steps are shown for illustrative and explanatory purposes only. Other embodiments can implement different particular steps, orders of steps, and combinations of steps to achieve similar functions or results. The example process 350 includes each of the steps 302, 304, 306, 308, and 310 that were introduced with reference to FIG. 3A. However, as shown in FIG. 3B, steps 306, 308, and 310 do not need to be executed sequentially after step 304.

Creation of the GRC database 214 at step 304 may not require any input from the administrators 103 other than providing the credentials needed to access provider accounts for the IT infrastructure under their management. The GRC controller 212 may then automatically discover and catalog any associated network resources regardless of what region, network, and/or resource group, etc., that they are part of. As described herein, this process may involve using provider API calls to discover and catalog distributed cloud networks.

Linking and/or grouping network resources at step 306, as shown in FIG. 3B, may be executed using the GRC database 214 created at step 304, or may be executed using a GRC database 214 that was created as part of another process. For example, in some embodiments, the GRC database 214 used at step 306 is received or identified by the GRC controller 212, e.g., from a datastore, from another user, from another organization, etc. Upon receiving access to a GRC database 214, the GRC controller 212 may receive input from the administrators 103 indicating any target networks or containers. As disclosed herein, the GRC controller 212 may then use the GRC database 214 to identify and link or group a subset of related network resources. This operation may not require additional API calls by the GRC controller 212 to the providers 170*a-b*. Instead, network resource configurations stored at the GRC database 214 may be relied upon.

The administrators 103 may subsequently use the linked or grouped subset of related network resources to perform updates to the associated IT infrastructure, and/or to create an IaC configuration specification which can then be edited and applied by the administrators 103 using an IaC IT infrastructure management application to update the associated network resources.

Similarly, updating a GRC database at step 308 as shown in FIG. 3B may be executed using the GRC database 214 created at step 304, or may be executed using a GRC database 214 that was created as part of another process. For example, in some embodiments, the GRC database 214 updated at step 308 is received or identified by the GRC controller 212, e.g., from a data store, from another user, from another organization, etc. Upon receiving access to a GRC database 214, the GRC controller 212 may update the GRC database 214 as described herein.

Additionally, updating an IT infrastructure using a GRC database 214 at step 310 as shown in FIG. 3B may be executed using the GRC database 214 created at step 304, or may be executed using a GRC database 214 that was created as part of another process. For example, in some embodiments, the GRC database 214 used at step 310 is received or identified by the GRC controller 212, e.g., from a data store, from another user, from another organization, etc. Upon receiving access to a GRC database 214, the GRC controller 212 may update the IT infrastructure as described herein.

Figure 4:
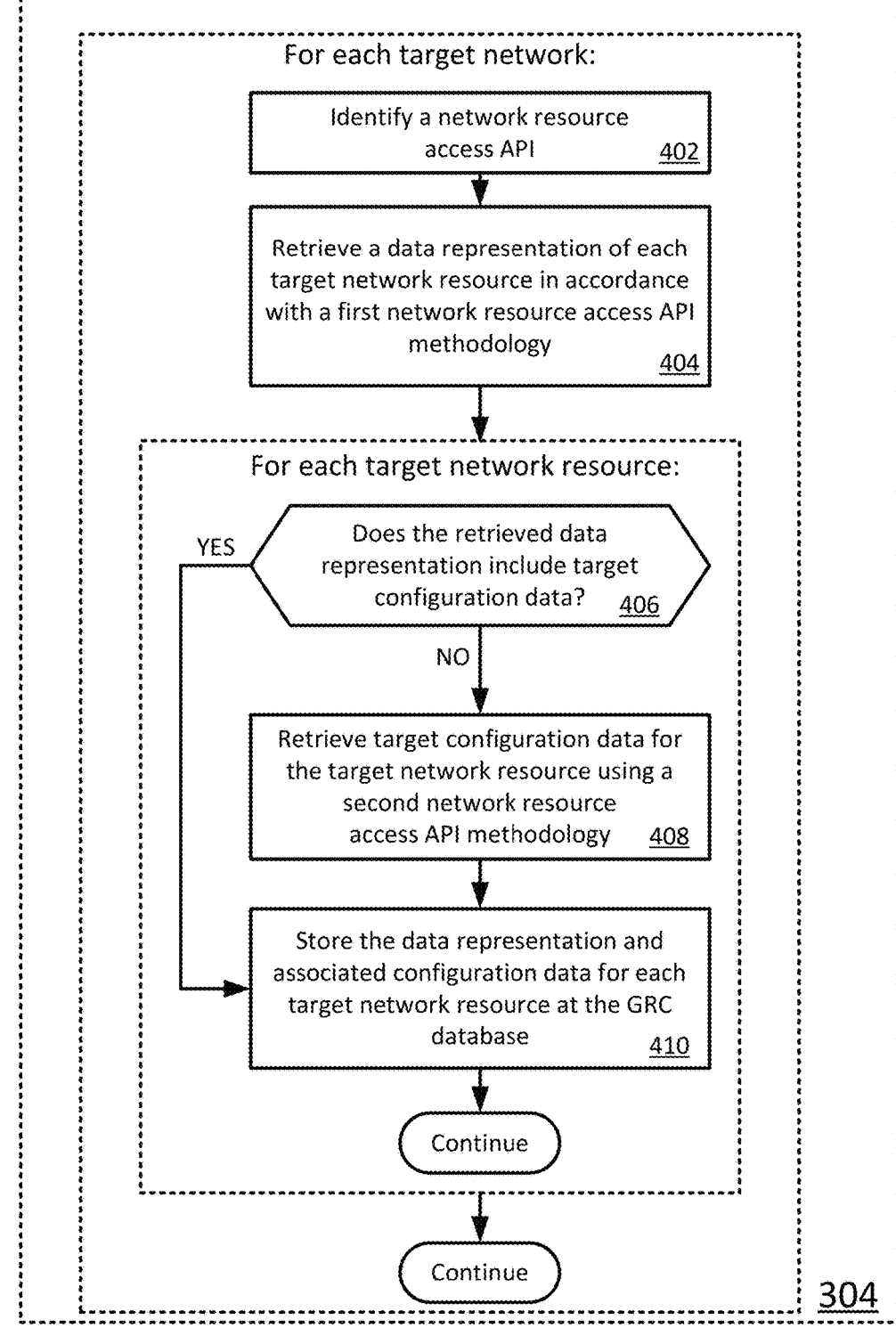
FIGS. 4-7 illustrate simplified portions of the processes introduced in FIGS. 3A-B, in accordance with some embodiments.

FIG. 4 illustrates a first example of a simplified portion of a process that implements step 304 introduced in FIGS. 3A-B, in accordance with some embodiments. The particular steps, order of steps, and combination of steps are shown for illustrative and explanatory purposes only. Other embodiments can implement different particular steps, orders of steps, and combinations of steps to achieve similar functions or results. As described below, steps 402-410 are further conducted by the GRC controller 212 for each target network, or a subset of the target networks, and steps 406-410 are conducted by the GRC controller 212 for each associated target network resource, or a subset of the associated target network resources.

At step 402, for each target network (identified by the credentials received at step 302 shown in FIGS. 3A-B), the GRC controller 212 identifies a network resource API (e.g., using the APIs 250*a-c* shown in FIG. 2). For example, cloud service providers typically offer an HTTP API. The HTTP API typically includes endpoints for listing existing network resources and typically exposes one endpoint per network resource type (e.g., an endpoint to list all VPCs; another endpoint to list all VMs, etc.), or a single endpoint to list all network resources of all types.

At step 404, for each target network, the GRC controller 212 retrieves a data representation of each target network resource of that target network using a first network resource API methodology. The data representation may include only a network resource ID, or may additionally include associated configuration data. The first network resource API methodology may involve querying a first endpoint or set of endpoints exposed by the API associated with the target network. Steps 406-410 are then conducted in a loop for each of the retrieved target network resources or a subset thereof.

At step 406, the GRC controller 212 determines if the received data representation includes target network resource configuration data. This is because a given provider may sometimes only provide network resource IDs via the network resource API and not provide full configuration data for the network resources.

In this context, the target network resource configuration data is the respective configuration data for a target network resource that the GRC controller 212 has been directed to gather. For example, in some scenarios, the GRC controller 212 may be configured by the administrators 103 to gather all available configuration data for each target network resource. In other scenarios, the GRC controller 212 may be configured by the administrators 103 to gather a subset of the total available configuration data for each target network resource. In yet other scenarios, the GRC controller 212 may be configured by the administrators 103 to gather a particular set or subset of configuration data for a given network resource based on an attribute of that particular network resource.

If it was determined at step 406 that the retrieved data representation includes the target configuration data, flow continues to step 410. Otherwise, flow continues to step 408.

At step 408, the GRC controller 212 uses a second network resource access API methodology to retrieve the target network resource configuration data associated with the network resource identified at step 406. For example, if the first network resource API methodology for a given target network only returned a network resource ID for a network function (e.g., using a first endpoint that returns all network resource IDs, but excludes configuration data thereof), the GRC controller 212 may then use a second network resource API methodology provided by that target network to retrieve a desired set of target network resource configurations for the target network resource. In some scenarios, the second network resource access API methodology may include retrieving the target network resource configurations one at a time using endpoints exposed by the API for fetching individual resources. In some scenarios, the second network resource access API methodology may require that the GRC controller 212 use a different API than the API identified at step 402. In other scenarios, the second network resource access API methodology may just involve the GRC controller 212 using a different set of functions within the same API that was identified at step 402. Flow of the process then proceeds to step 410.

At step 410, a retrieved data representation and associated configuration data for each of the identified target network resources is stored by the GRC controller 212 at the GRC database 214 in a format that allows them to be queried later by the GRC controller 212, the IaC IT infrastructure management application 205, or another IT infrastructure management tool operated by the administrators 103.

In some embodiments, the retrieved data representation and associated configuration data are stored in the GRC database 214 in the format in which the data was received, and which may be unique to the particularities of that associated target network's provider. In other embodiments, the retrieved data representation and associated configuration data are stored in the GRC database 214 in a format that is agnostic to the associated network provider.

Steps 406-410 then continue for any other remaining network resources, and steps 402-410 continue until each target network has been considered. In some embodiments, upon completion, flow continues to step 306 shown in FIG. 3A. In other embodiments, flow may continue directly, or at a later time, to any of steps 306, 308, and/or 310 as shown in FIG. 3B.

Figure 5:
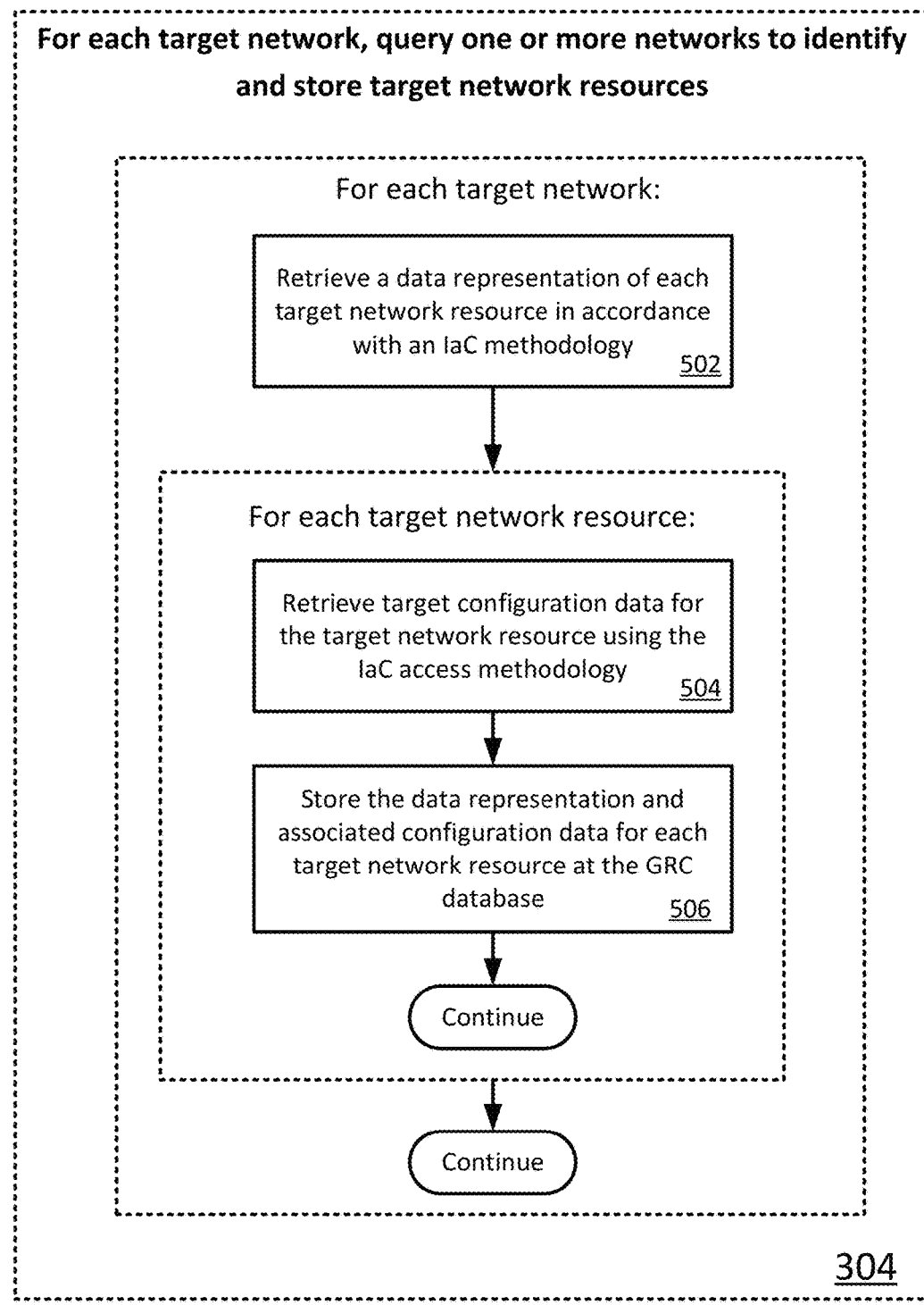

FIG. 5 illustrates a second example of a simplified portion of a process that implements step 304 introduced in FIGS. 3A-B, in accordance with some embodiments. The particular steps, order of steps, and combination of steps are shown for illustrative and explanatory purposes only. Other embodiments can implement different particular steps, orders of steps, and combinations of steps to achieve similar functions or results. As described below, steps 502-506 are conducted by the GRC controller 212 for each target network or a subset of the target networks, and steps 504-506 are further conducted by the GRC controller 212 for each target network resource or a subset of the target network resources.

At step 502, for each target network, the GRC controller 212 retrieves a data representation (e.g., a network resource ID) of each target network resource of that target network in accordance with an Infrastructure as Code (IaC) methodology. For example, in some embodiments, the IaC IT infrastructure management application 205 is operable to access the target network or the subset of target networks using associated APIs thereof to gather network resource data. In other embodiments, the IaC IT infrastructure management application 205 may be implemented as a web-based application which itself is accessed by the administrators 103 using one or more APIs.

After step 502, steps 504 and 506 are then conducted for each of the target network resources. At step 504, the GRC controller 212 uses the IaC methodology to retrieve target configuration data associated with the retrieved data representation of a network resource identified at step 502. For example, some IaC tools (such as TERRAFORM) offer an "import" capability. This allows a user to generate an IaC configuration (in the tool's format—for TERRAFORM, this is the HASHICORP CONFIGURATION LANGUAGE (HCL)) for existing network resources, even if the network resources were not originally created with that IaC tool.

In some scenarios, the GRC controller 212 may first obtain a list of network resource IDs to import using the IaC methodology (e.g., at step 502), create an IaC configuration file with an empty block for each of the network resources identified for import, and then execute the IaC "import" command to fill each block with the network resource's configuration (in that IaC tool's format).

At step 506, a retrieved data representation and the associated configuration data for each of the identified target network resources are stored by the GRC controller 212 at the GRC database 214 in a format that allows them to be queried later by the GRC controller 212, by the IaC IT infrastructure management application 205, or by another IT infrastructure management tool operated by the administrators 103.

In some embodiments, the IaC data retrieved in step 504 may be stored in the GRC database 214 as a single file. In other embodiments, the GRC controller 212 may break the file into individual blocks (e.g., one per network resource) and then store them individually in the GRC database 214.

Steps 504-506 then continue for any other remaining network resources, and steps 502-506 continue until each target network has been considered. In some embodiments, upon completion, flow continues to step 306 shown in FIG. 3A. In other embodiments, flow may continue directly, or at a later time, to any of steps 306, 308, and/or 310 as shown in FIG. 3B.

As mentioned above, in a simple example scenario, the GRC controller 212 may annotate IP ranges in firewall rules in one platform with the name of the subnet resource that owns that IP range in another platform, and thereafter keep the firewall rules up-to-date if the subnet's IP range is modified. For example, with reference to FIG. 2, upon determining by the GRC controller 212 that an IP address range within the VNET$^1$ subnet 250 has changed, the GRC controller 212 may update the GRC database 214 to reflect the changed IP address range, and then propagate the new IP address range to the firewall 220, and/or update the firewall rules 222 thereof in accordance with the new IP address range.

To make use of the GRC database's knowledge of all network resources across all providers in order to link related resources, the administrators 103 may specify which first properties of a first network resource correspond to which second properties of a second network resource. The GRC controller 212 may thereafter find/use those links in response to directives from the administrators 103, the IaC IT infrastructure management application 205, or another IT infrastructure management tool. However, relying on the administrators 103 to specify links between network resources may become cumbersome, if not impossible, as the complexity of a distributed cloud network increases and as network resources within the network change rapidly over time. When performed manually, identifying and specifying links may be an incredibly time-consuming, tedious, and error-prone process. Therefore, in the embodiments described below, the GRC controller 212 may advantageously automatically determine, store, and update links between network resources.

In some embodiments, the GRC may determine linkages between network resources using "linking patterns". For example, a linking pattern determined by the GRC controller 212 may involve identifying that the IP address associated with a VM is the same as an IP address in a firewall rule. As such, the GRC controller 212 may identify that those two resources "have the potential" to be linked in this way. The GRC controller 212 may then use those linking patterns (i.e., potential links) to identify actual links between network resources.

For example, the GRC controller 212 may express a general linking pattern as

{Subnet.AddressRange<->NetworkSecurityGroupRule.Target( )}, where the '( )' notation means that Target is a collection of values. As such, the Subnet.AddressRange may be one of many values within the NetworkSecurityGroupRule.Target( ).

In this example, given Subnet A and NetworkSecurityGroupRule B, the GRC controller 212 will only determine an actual link between the two if the value of A.AddressRange matches one of the values in B.Target( ). That is, if Subnet A has AddressRange 192.168.100.13/24, but the Target of NetworkSecurityGroupRule B is (10.150.0.24/24), then the GRC controller 212 will not determine that there is a link therebetween.

In a first approach for generating and storing links, the GRC controller 212 may create explicit lists of mappings ("explicit links") between network resource configurations and subsequently store the mappings as links at the GRC database 214. In some embodiments, a link is stored in the GRC database 214 as an annotation made to, or in association with one or more network resources or configurations stored at the GRC database 214. For example, if first and second network resources are added to the GRC database 214 as first and second data objects, a link therebetween may be stored by annotating each of the first and second data objects by the GRC controller 212 to indicate the link.

In a simplified example, the GRC controller 212 may link a first field of the first network resource (i.e., a first property) to a second field of the second network resource (i.e., a second property). With reference to FIG. 2, the first network resource might be the firewall 220 provisioned at the VPC$^1$ network 102 of the Provider$^1$ 170a, and the first field might be a target range of network addresses for a given firewall rule 222. In this example, the second network resource might be the subnet 252 provisioned at the VNET$^1$ network 106 of the Provider$^2$ 170b, and the second field might be a network address range associated with a network resource 252 in the subnet 250. The GRC controller 212 may express such cross-provider network resource linking as:

{VNET$^1$Subnet.AddressRange<->
VPC$^1$NetworkSecurityGroupRule.Target( )}, which means that the AddressRange field of the VNET$^1$ subnet resource can appear as a value in the Target field of the VPC$^1$ NetworkSecurityGroupRule. As mentioned above, the '( )' notation means that Target is a collection of values, so the VNET$^1$Subnet.AddressRange may be one of many values within VPC$^1$NetworkSecurityGroupRule.Target( ). The GRC controller 212 may also create links between scalar values (i.e., individual values).

In addition to such cross-network and cross-provider network resource linking, the GRC controller 212 is additionally operable to create and store links between network resources within the same network, and across networks of the same provider. With reference to FIG. 2, the first network resource might be the firewall 220 provisioned at the VPC$^1$ network 102 of the Provider$^1$ 170a, and the first field might be a target range of network addresses for a local firewall rule 225. In this example, the second network resource might be a network resource 226 at the same VPC$^1$ network 102. The GRC controller 212 may express such intra-network resource linking as:

{VPC$^1$.IPAddressRange<-
>VPC$^1$NetworkSecurityGroupRule.Target( )}.

In a second approach for generating and storing links, the GRC controller 212 may attach an indication of a property type to each network resource property. Thereafter, fields with the same type may be linked by the GRC controller 212 as a "field-type link" and subsequently stored in the GRC database 214. Continuing the example above, the GRC controller 212 may determine the following field values:

VNET$^1$Subnet {
AddressRange: CIDR // AddressRange's type is CIDR
// other fields...
}
VPC$^1$Network {
IPAddressRange: CIDR // IPAddressRange's type is CIDR
// other fields...
}
VPC$^1$NetworkSecurityGroupRule {
Target: ( )CIDR // Target's type is a list of CIDRs
// other fields...
}

The fields above indicate that VNET Network has a field called AddressRange, the type of which is CIDR (Classless Inter-Domain Routing). Because the VPC NetworkSecurityGroupRule's Target is a list of CIDRs, the GRC controller 212 is aware that any value stored within a Network Security Group rule's Target list might be an AddressRange for VNET$^1$ Network.

Upon determining mappings ("links") between network resources within networks, across networks of the same provider, and across networks of different providers, in some embodiments, the GRC controller 212 annotates the data representations of network resources stored at the GRC database 214 to reflect any link relationships with other data representations of network resources stored at the GRC database 214.

Figure 6:
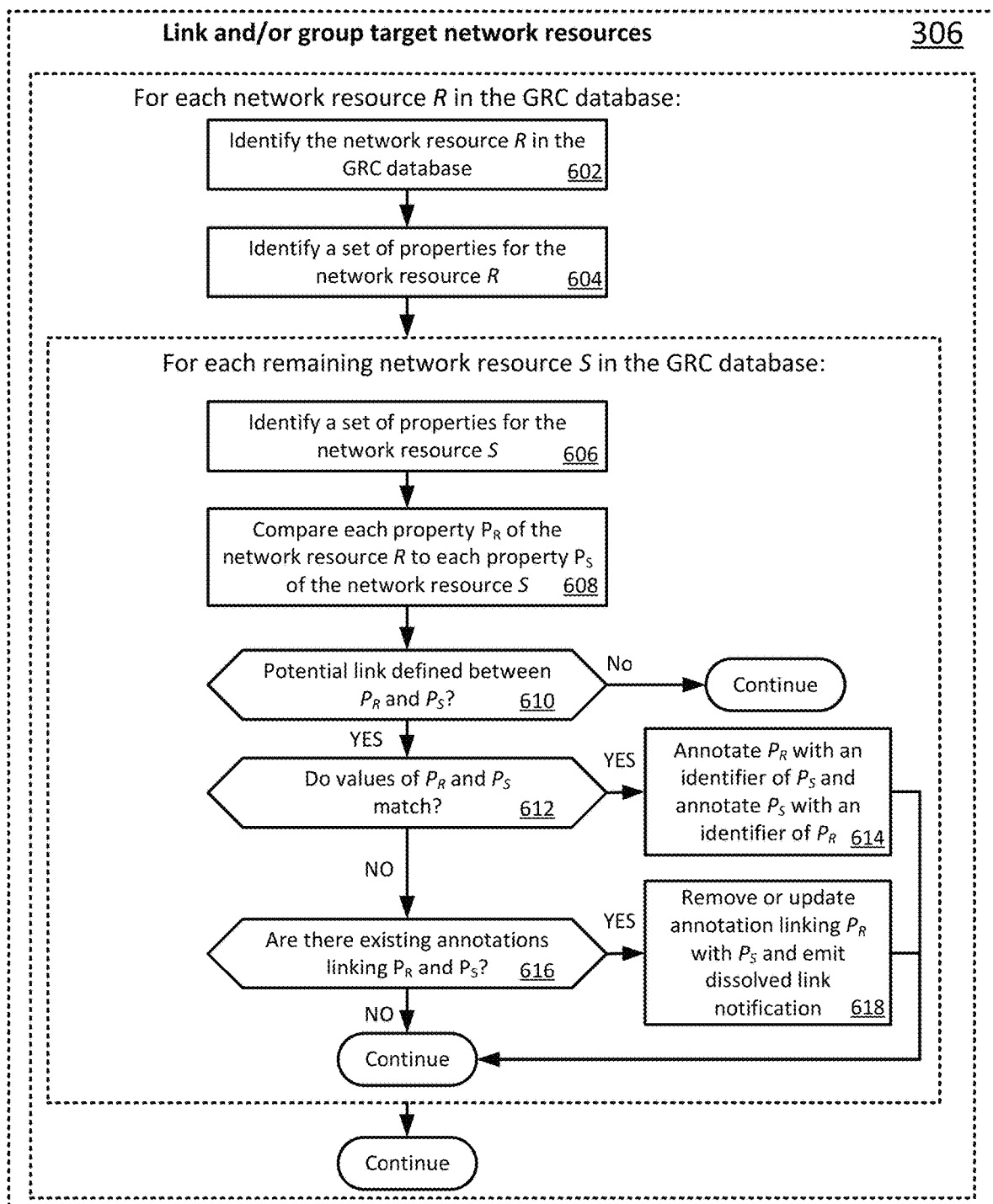

In a first approach, the GRC controller 212 determines network resource links at step 306 shown in FIGS. 3A-B as network resources are added to the GRC database 214, or in response to a received directive. To elaborate, FIG. 6 illustrates an example of a simplified portion of a process that implements linking target network resources at step 306 introduced in FIGS. 3A-B, in accordance with some embodiments. The particular steps, order of steps, and combination of steps are shown for illustrative and explanatory purposes only. Other embodiments can implement different particular steps, orders of steps, and combinations of steps to achieve similar functions or results. As described below, in some embodiments, steps 602-618 are conducted by the GRC controller 212 for each target network resource R stored at the GRC database 214 for the one or more target networks. In other embodiments, steps 602-618 are conducted by the GRC controller 212 for each target network resource R of a subset of network resources stored at the GRC database 214 for the target network (e.g., of a particular group, subnet, container, region, provider, etc.).

At step 602, the GRC controller 212 identifies a first network resource R in the GRC database 214. At step 604, the GRC controller 212 identifies a set of properties (e.g., field values) for the network resource R.

In some embodiments, steps 606-618 are then carried out by the GRC controller 212 for each other network resource S stored at the GRC database 214 (i.e., the network resources excluding the network resource R). In other embodiments, steps 606-618 are carried out by the GRC controller 212 for each network resource S being of a subset of the total network resources stored at the GRC database 214 (e.g., of a particular group, subnet, container, region, provider, etc.).

At step 606, the GRC controller 212 identifies a set of properties for the network resource S. At step 608, the GRC controller 212 compares each property $P_R$ of the network resource R to each property $P_S$ of the network resource S. At step 610, the GRC controller 212 determines if a potential link (i.e., a link pattern) exists between the property $P_R$ and the property $P_S$. The GRC controller 212 may determine at step 610 if a potential link between the property $P_R$ and the property $P_S$ exists based on an explicit link definition approach or based on a field-type link approach, as described above.

If it is determined at step 610 that a potential explicit link or field-type link exists between the property $P_R$ and the property $P_S$, flow continues to step 612, otherwise steps 606-618 continue for the next resource S. At step 612, if the GRC controller 212 determines that the values of $P_R$ and $P_S$ match (or if one property is a collection that contains the other property's value), flow continues to step 614. In some embodiments, determining by the GRC controller 212 that two or more properties "match" includes determining if the values thereof are equal, determining that a value of the first property is contained in a collection of values of the second property, determining that values of the first property and the second property overlap, determining a relationship between a numerical or text range of a value of the first property and a numerical or text range of a value of the second property, and so on. For example, determining that two properties match may include determining that two scalar values are equal, determining that a scalar value is contained in a collection of values, determining that a particular IP address is within a range of IP addresses, determining that a first region is part of a second region, etc.

At step 614, the GRC controller 212 annotates the property $P_R$ within the GRC database 214 with an identifier of $P_S$, and similarly annotates the property $P_S$ within the GRC database 214 with an identifier of $P_R$. Steps 606-618 then continue for the next resource S.

If it was determined at step 612 that the values of $P_R$ and $P_S$ do not match (or if one property is not a collection that contains the other property's value), flow continues to step 616. At step 616, if the GRC controller 212 determines that the GRC database 214 already contains existing annotations linking the properties $P_R$ and $P_S$ (but all previous checks for mappings therebetween failed), flow continues to step 618. At step 618, the GRC controller 212 removes or updates any annotations linking the property $P_R$ with the property $P_S$ in the GRC database 214 and emits a "dissolved link" notification (e.g., to the administrators 103, or another IT infrastructure management application). In response to receiving the dissolved link notification, the administrators 103 or the IT infrastructure management application may then take action, for example by updating a firewall rule.

To elaborate, an existing link between two network resources identified by the GRC controller 212 at step 610 may no longer be accurate based on changes within or across networks. For example, perhaps a change made to the VNET[1] subnet 250 was significant enough, or was made out-of-band, such that the firewall rules 222 for the VNET[1] subnet are no longer relevant. Therefore, at step 612, it is determined whether, in addition to a potential link simply existing between the properties $P_R$ and $P_S$, if the values of those properties are still related to one another. If the properties $P_R$ and $P_S$ are no longer related to one another, the GRC controller 212 removes the link association for those network resources within the GRC database 214.

Steps 606-618 then continue for any other remaining network resources S stored at the GRC database 214 and steps 602-618 continue until each of the network resources R stored at the GRC database 214 have been considered. In some embodiments, upon completion, flow continues to step 308 shown in FIG. 3A. In other embodiments, flow may continue directly, or at a later time, to any of steps 308, and/or 310 shown in FIG. 3B.

Having determined and annotated each of the links between network resources stored at the GRC database 214, the GRC controller 212 may then use the annotated links to perform actions that conventional IaC IT infrastructure management tools cannot accomplish. For example, the GRC controller 212 may use the stored links to annotate and display firewall rule targets with the name of the network subnets corresponding to the target's IP address ranges. When the administrators 103 or the IT infrastructure management application 205 subsequently query all of the firewall rules from the GRC database 214, the annotations may be used for each rule's Target field to display the linked subnet names.

In some embodiments, the GRC controller 212 may prompt a user, such as the administrators 103, to confirm an annotated link upon creation/storage at step 612. With reference to FIG. 2, in a simplified example, a property AddressRange of the VNET[1] subnet 250 may be equal to {10.10.10.10/24}, and VPC[1]NetworkSecurityGroupRule's Target may include the value {10.10.10.10/24}. If the administrators 103 want the GRC controller 212 to update the Network Security Group rule when the VNET[1] subnet 250's address range changes, the administrators 103 may confirm the link between VNET[1] subnet 250 and VPC[1]NetworkSecurityGroupRule.

On the other hand, if the administrators 103 do not want the GRC controller 212 to perform the aforementioned update, the administrators 103 should not confirm the link. Thereafter, if the VNET[1] subnet 250's address range subsequently changes to {192.168.0.10/24}, the GRC controller 212 will determine whether or not to update the Network Security Group rule's target based on whether or not the administrators 103 confirmed the link.

In some embodiments, instead of annotating and storing network resource links each time a network resource is added to the GRC database 214, the GRC controller 212 may generate and store such links on demand in response to the GRC controller 212 performing a task that requires knowledge of any links between network resources. A simple example of such a task includes generating a table of firewall rules before displaying the table to the administrators 103.

With reference to FIG. 2, in one such approach, to generate a table of firewall rules for the firewall 220 at the VPC[1] network 102, the GRC controller 212 scans for any network resource in the GRC database 214 having a type with an explicit link to the VPC[1]NetworkSecurityGroupRule type (i.e., using the explicit link determination approach described above), or scans for any network resources in the GRC database 214 that contain properties having types that match the types of the VPC[1]NetworkSecurityGroupRule properties (i.e., using the typed link determination approach described above). For any such network resource in the GRC database 214 (i.e., network resources that might have links to the firewall rules in the table), the GRC controller 212 checks for matching property values as described above with reference to step 612 shown in FIG. 6.

Such scanning may need to be performed on-demand any time an updated version of a network resource is discovered by the GRC controller 212 and added to the GRC database 214. As a simple example scenario, properties of the VNET[1] subnet 250 stored in the GRC database 214 have been updated by the administrators 103. Prior to the update, the VNET[1] subnet 250 AddressRange was {10.10.10.10/24}, and after the update, it is {192.168.0.10/24}. If the administrators 103 have elected for the GRC controller 212 to keep firewall rules up-to-date, the GRC controller 212 scans all Network Security Group rules in the GRC database 214 and updates any instances of {10.10.10.10/24} to {192.168.0.10/24}.

In addition to mapping and annotating links between network resources stored at the GRC database 214, the GRC controller 212 may advantageously discover and store groupings of network resources within and across networks and across providers. For example, in some scenarios, the administrators 103 may want to import a subset of the network resources under their management into the GRC database 214 and/or into an IaC specification (where the network resources will then be monitored for drift, etc.). However, because even simple networks comprise many network resources, selecting which ones to add to a specification manually can be tedious, if not impossible. Thus, in some embodiments, the administrators 103 may manually indicate only which networks, i.e., target networks, such as virtual private clouds (VPCs), virtual networks (VNets), and/or other containers, should be included in the specification, and any target network resources "relevant" to those target networks are automatically imported into the GRC database 214 by the GRC controller 212 as well. Such relevant network resources include descendant network resources of a network, such as Subnets, Virtual Machines (VMs), Route Tables when they are appropriate and supported by a provider, and network security groups when they are appropriate and supported by a provider, among others.

Other relevant network resources to be grouped include network resources that reference or are referenced by a network or container, or one of its descendants. Additionally, relevant network resources may include resources that reference or are referenced by other relevant network resources, and so on, unless that resource is another network or container or a descendant of another network or container. For example, such network resources include Route Tables and Network Security Groups (when appropriate and supported by a provider), Peering connections, VPN Gateways and connections, Transit Gateways, and Virtual WAN Hubs, among others.

Figure 7:
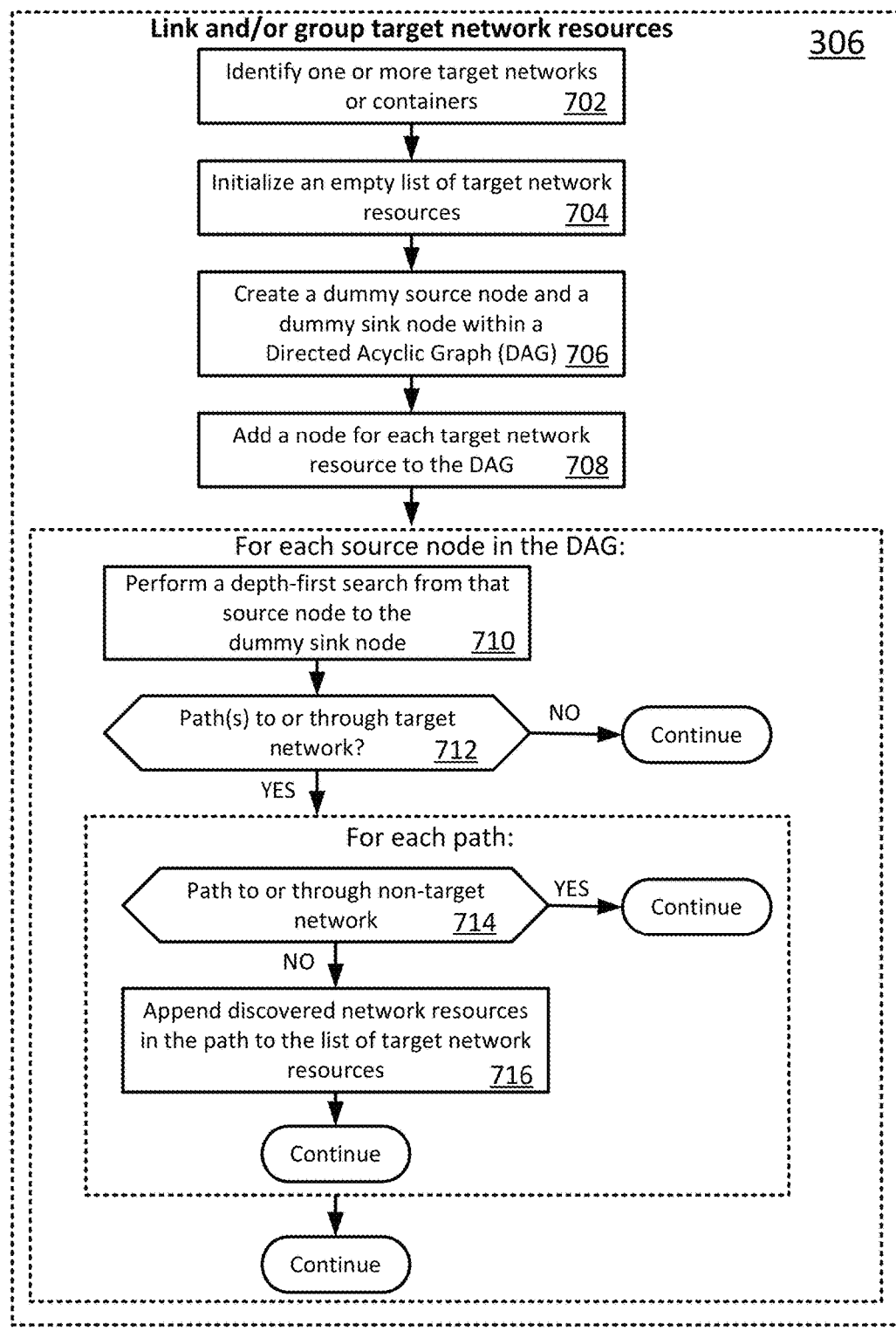

To elaborate, FIG. 7 illustrates an example of a simplified portion of a process that implements step 306 introduced in FIGS. 3A-B, in accordance with some embodiments. The particular steps, order of steps, and combination of steps are shown for illustrative and explanatory purposes only. Other embodiments can implement different particular steps, orders of steps, and combinations of steps to achieve similar functions or results. FIG. 7 is described with reference to FIG. 8A-8G, which illustrate simplified portions of a process for grouping network resources, in accordance with some embodiments.

At step 702, the GRC controller 212 identifies (e.g., based on a directive received from the administrators 103), one or more target networks or containers. The identified target networks or containers may be already stored at the GRC database 214, or may not yet be stored at the GRC database 214. In the latter scenario, the GRC controller 212 may add network resources to be grouped to the GRC database as part of step 708.

Figure 8A:
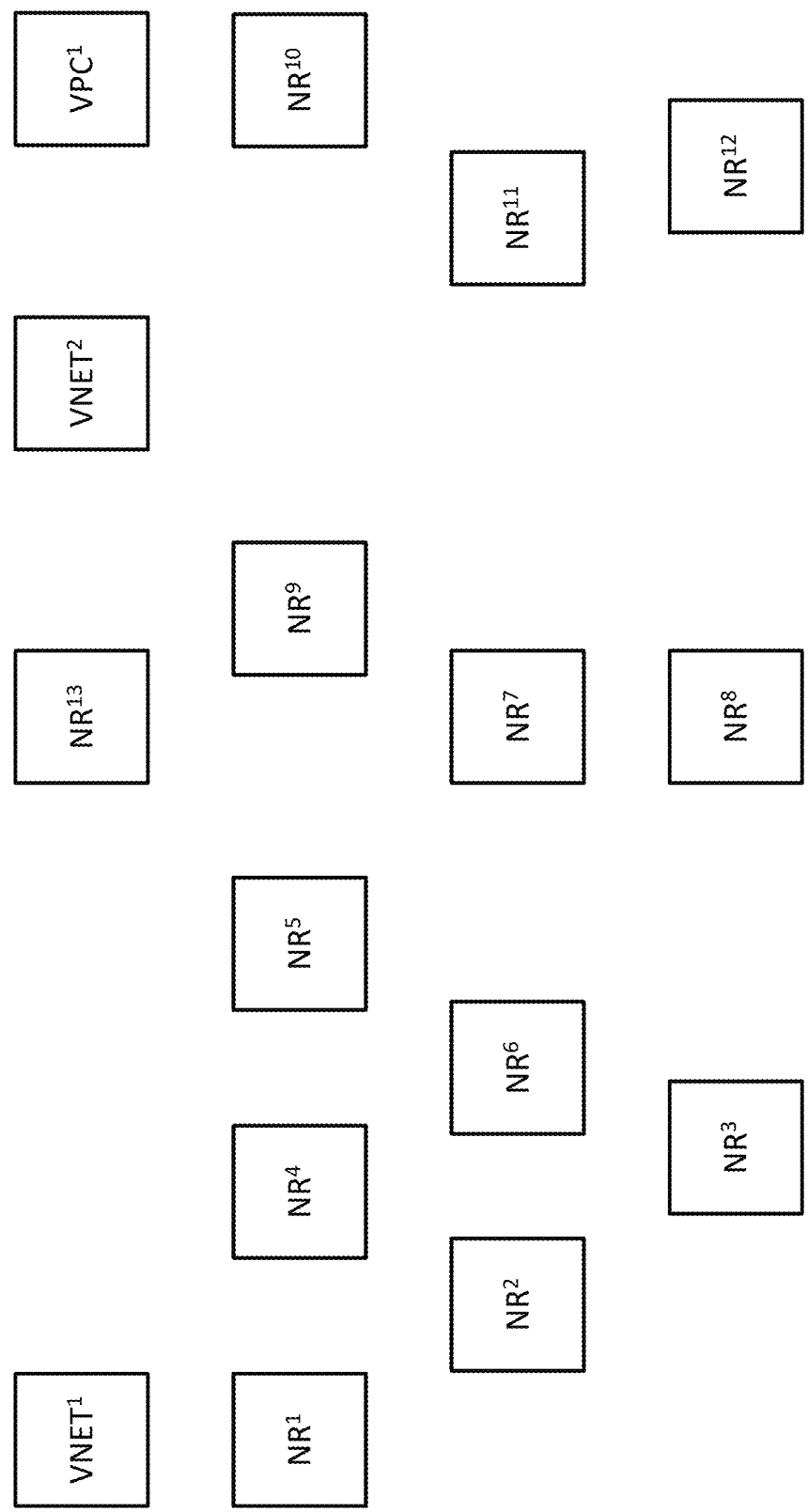
FIGS. 8A-G illustrate simplified portions of a process for grouping network resources, in accordance with some embodiments.

At step 704, the GRC controller 212 initializes an empty list of relevant network resources that are associated with the target network. With reference to FIG. 8A, $VNET^{1-2}$ and $VPC^1$ are examples of networks, and $NR^{1-13}$ are examples of network resources. In the example shown, the GRC controller 212 (not shown) is aware of each of the networks $VNET^{1-2}$ and $VPC^1$ and the network resources $NR^{1-13}$ (i.e., stored in the GRC database 214), but is not yet aware of how the network resources are connected to one another and how they are grouped within the networks.

Figure 8B:
Figure 8B:
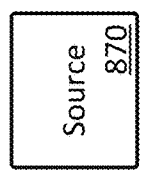

At step 706, and as illustrated in FIG. 8B, the GRC controller 212 creates a dummy source node 870 and a dummy sink node 872 within a Directed Acyclic Graph 802 that will contain a respective node representing each of the networks and network resources associated with the network 800. A Directed Acyclic Graph (DAG) is a graph structure that includes source nodes (nodes with no incoming edges), sink nodes (nodes with no outgoing edges), and intermediate nodes connected by edges, where each edge has a direction, and no cycles exist. In a DAG, it is possible to move from one node to another following the direction of the edges, but the original node may not be returned to, ensuring an acyclic structure. As disclosed herein, the GRC controller 212 builds a dependency graph among the target networks and target network resources to determine how the networks and networks are grouped (i.e., logically and performatively connected to one another).

Figure 8C:
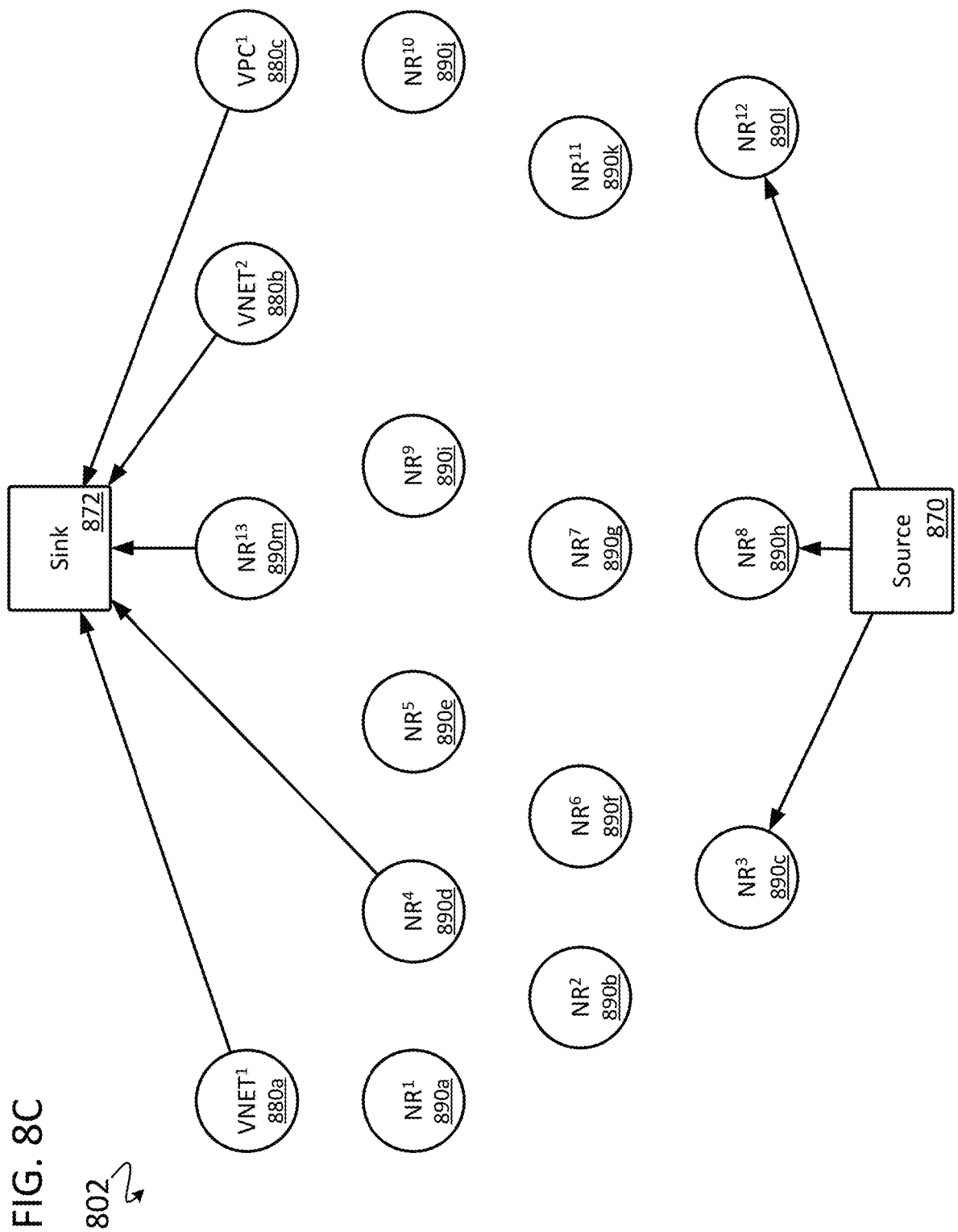

At step 708, the GRC controller 212 adds a node for each target network resource to the DAG 802. As illustrated in FIG. 8C, a node 880a representing the network $VNET^1$, a node 880b representing the network $VNET^2$, a node 880c representing the network $VPC^1$, and nodes 890a-m representing the network resources $NR^{1-13}$ are added to the DAG 802, The GRC controller 212 thereafter creates initial connections between the dummy source node 870 and source nodes 890c, 890h, and 890l, as well as initial connections between the dummy sink node 872 and sink nodes 880a-880c, 890d, and 890m.

To elaborate, the GRC controller 212 creates a "dummy dependency" from the dummy sink node 872 to any node within the DAG 802 having no outbound edges (i.e., that does not depend on any other nodes). Likewise, the GRC controller 212 creates an inbound edge from the dummy source node 870 to any node within the DAG 802 having no inbound edges (i.e., no network resources depend on this network resource). This determination may be accomplished by the GRC controller 212 using a linear scan through a list of nodes within the DAG 802 to determine an inbound/outbound edge count for each node. The determination does not require that the nodes be visited in a particular order. Steps 710-716 are then carried out for each source node of the DAG 802.

Figure 8D:
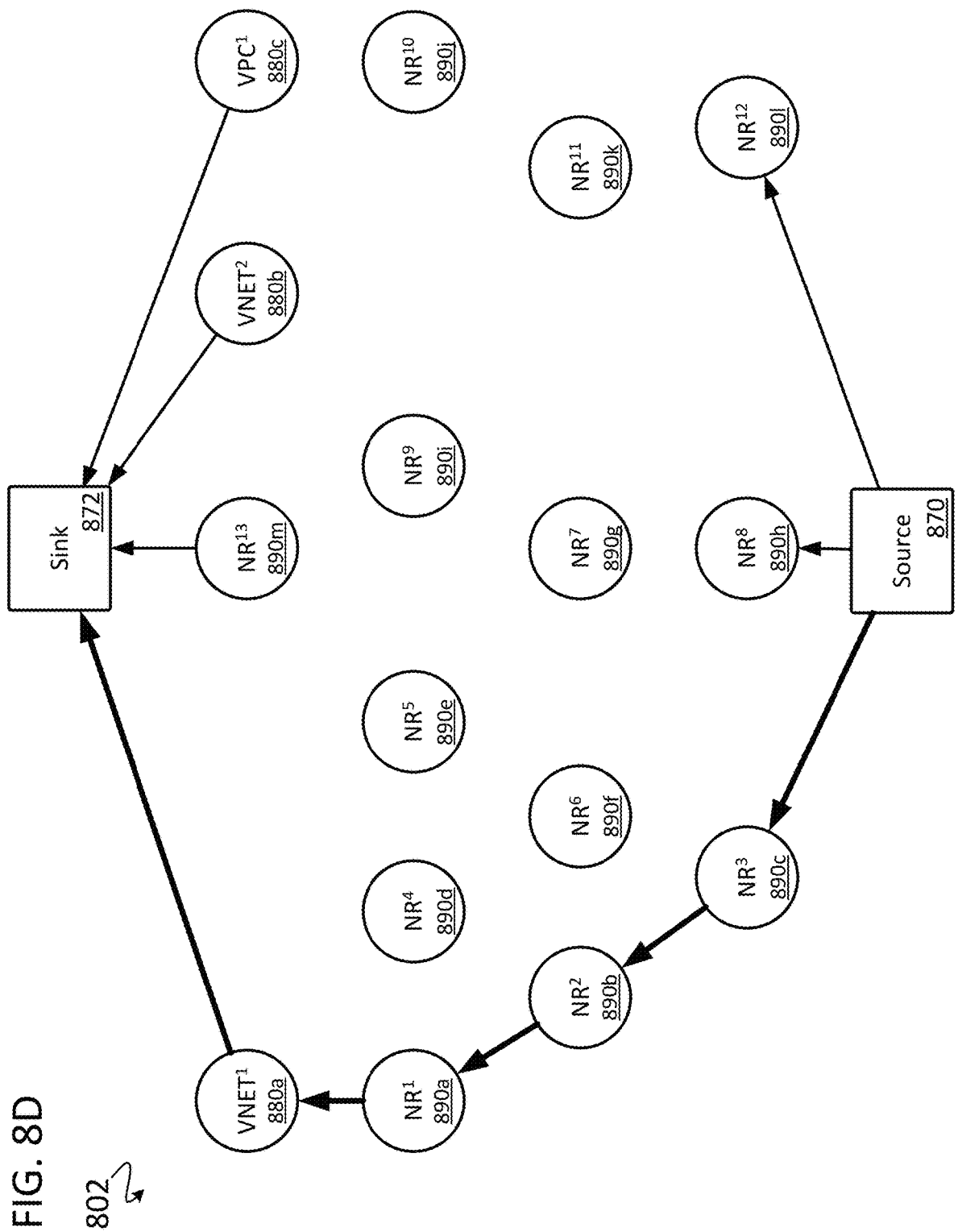

At step 710, and as illustrated in FIG. 8D, the GRC controller 212 performs a depth-first search within the DAG 802 based on network resource configurations stored in the GRC database 214 and/or configurations retrieved on demand to determine a path from the source node currently being considered to the dummy sink node 872 or any other sink node (i.e., terminating node) of the DAG 802. In the example shown in FIG. 8D, the depth-first search from a source node $NR^3$ 890c to the dummy sink node 872 is shown by a bolded path. Each node of the DAG 802 represents a target network resource shown in FIG. 8A, and a directed edge (i.e., a "path") from a node A to a node B indicates that node A "depends on" node B in the sense that node B must be created before node A can be created.

Figure 8E:
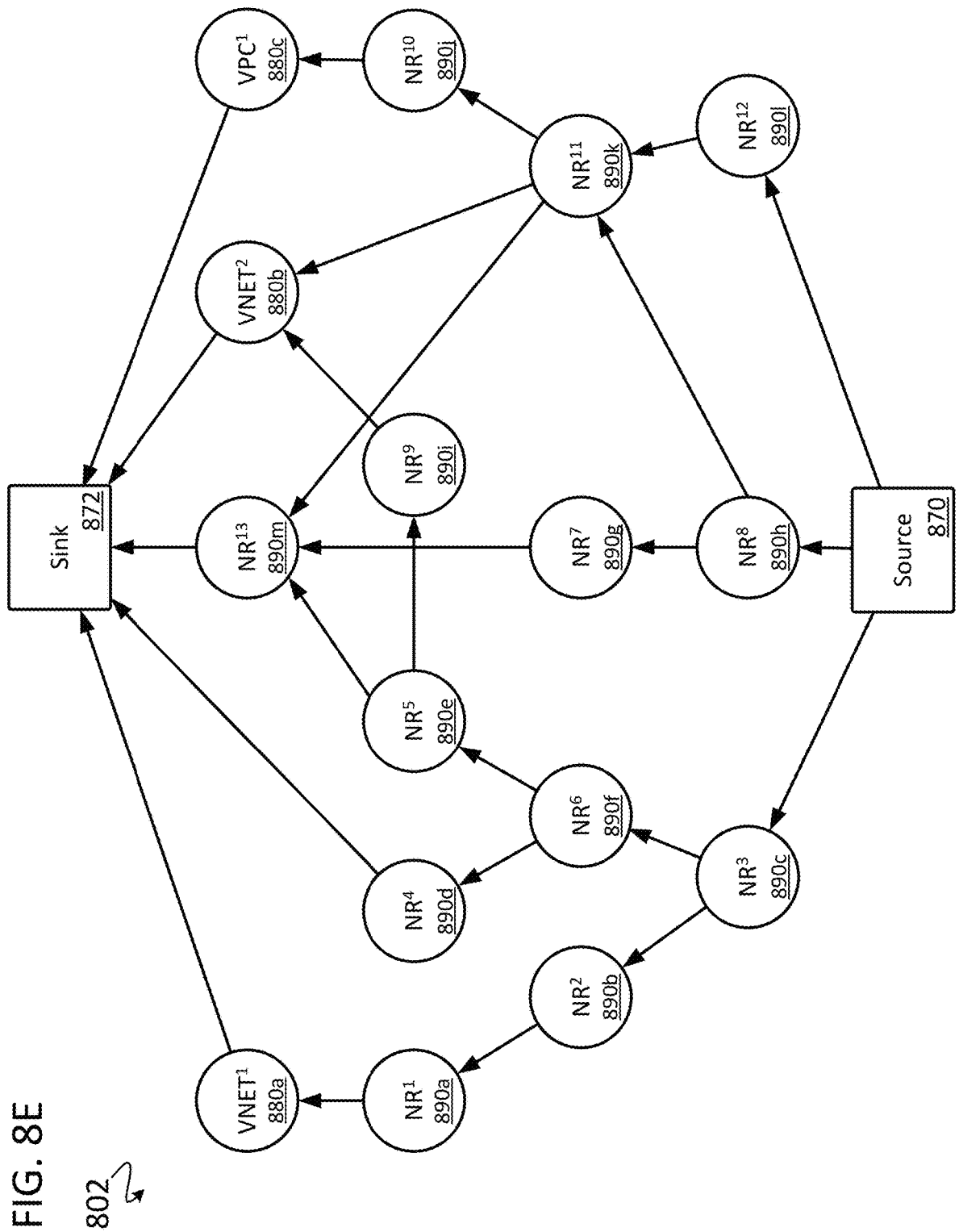

As shown in FIG. 8E, as the steps 710-716 are conducted for each source node of the DAG 802, the GRC controller 212 determines paths from each of the source nodes $NR^3$ 890c, $NR^8$ 890h, and $NR^{12}$ 890l to the dummy sink node 872. As compared to conventional DAG traversal methods, the GRC controller 212 does not mark each network resource node within the DAG 802 as "visited" as this may prevent each of the possible paths from being discovered by the GRC controller 212. This operation is considered to be safe as the graph is acyclic. If no paths go through or to the target network, steps 710-716 are repeated for the next source node.

Figure 8F:
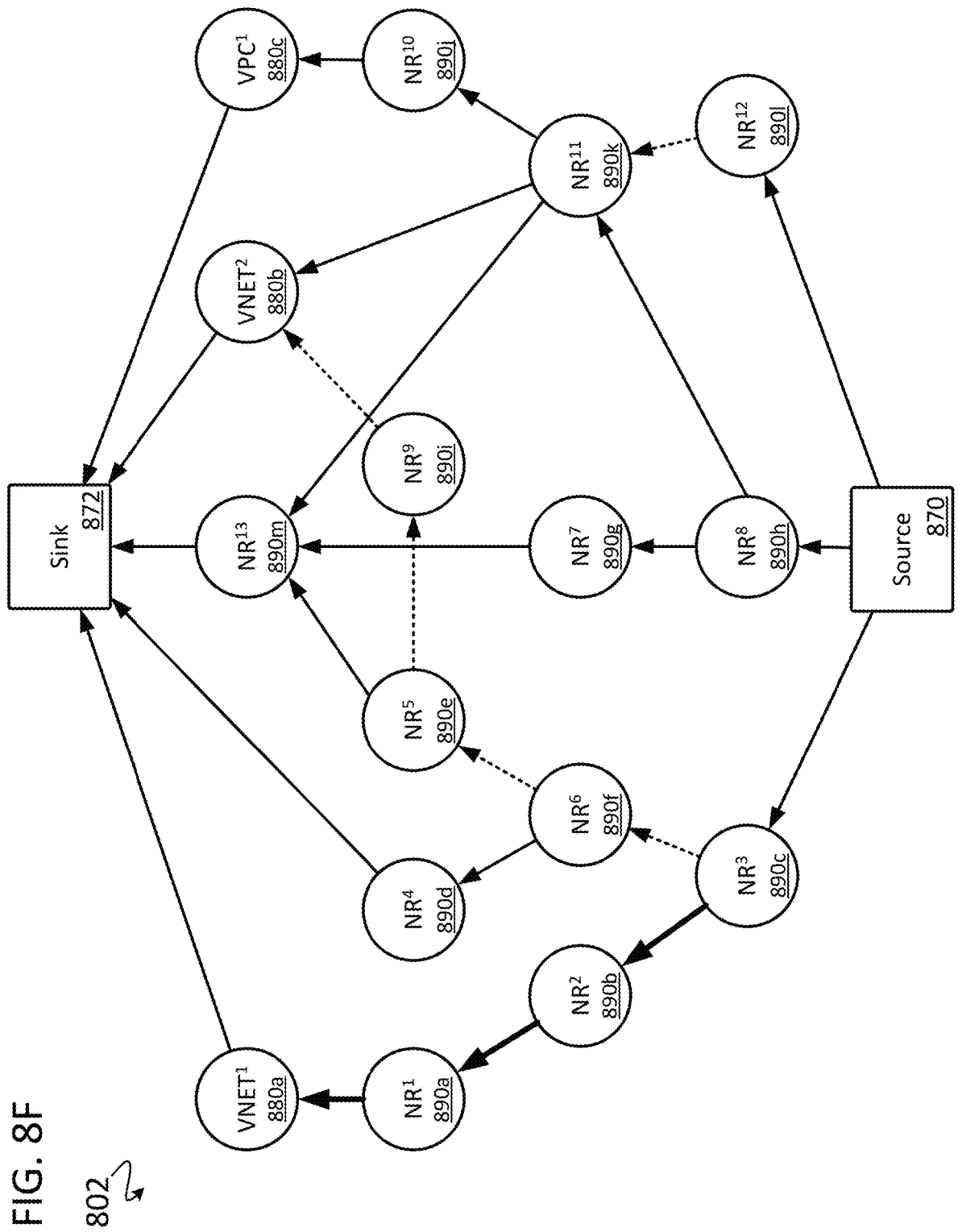

At step 712, the GRC controller 212 determines for each source node if there are one or more paths from that node to or through the target network or container identified at step 702. As shown in FIG. 8F, if the target network identified at step 702 was $VNET^1$ 880a, a bolded path is shown which traverses from the source node $NR^3$ 890c to the target network $VNET^1$ 880a and therefore is considered to reach the target network $VNET^1$ 880a. By comparison, a dashed path is shown which traverses from the source node $NR^3$ 890c to the network $VNET^2$ 880b. The dashed path is an example of a path that does not reach the target network $VNET^1$ 880a.

If it is determined at step 712 that there is at least one such path, flow continues to step 714. Otherwise, the outer loop of steps 710-716 continues until each of the source nodes in the DAG has been considered.

At step 714, the GRC controller 212 determines if the path determined at step 710 goes to or through a non-target network. That is, the GRC controller 212 identifies any path originating from a source node that reaches a sink node within the DAG that is not of a non-targeted network.

Figure 8G:
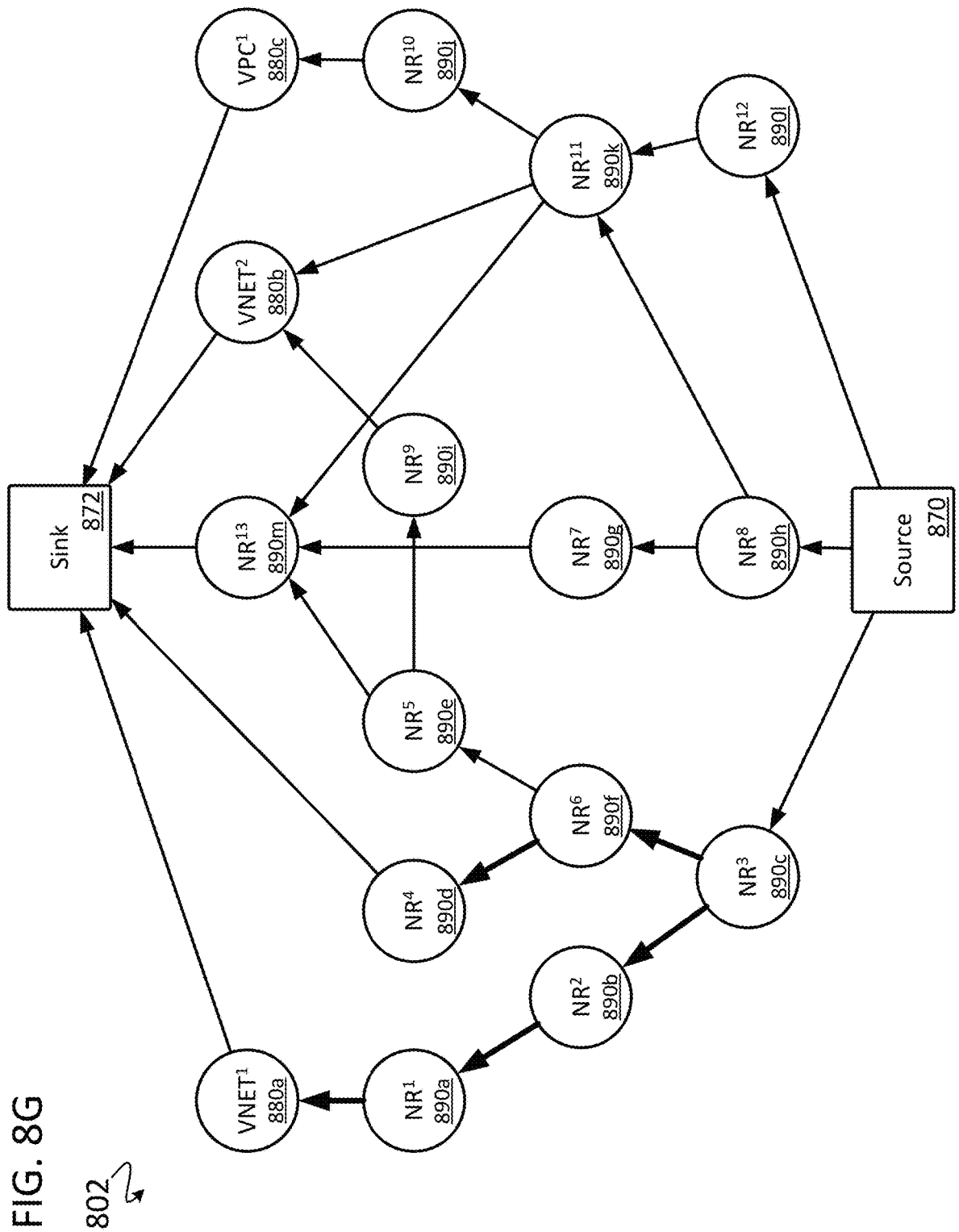

With reference to FIG. 8G, the bolded path originates at the source node and either terminates at an edge node (e.g., $NR^4$ 890d) or at the target network $VNET^1$ 880a, and does not reach a non-targeted network (e.g., $VNET^2$ 880b and/or $VPC^1$ 880c).

If it is determined at step 714 that the path does not reach a non-target network (i.e., as shown in FIG. 8G), flow continues to step 716. Otherwise, the inner loop of steps 714-716 continues until each of the paths determined at step 710 has been considered.

At step 716, the GRC controller 212 appends the network resources (i.e., nodes of the path being considered) and the dependencies therebetween (i.e., groupings) to the list of target network resources that were initialized at step 702. The GRC controller 212 may thereafter store the list of target network resources at the GRC database 214. The inner loop of steps 714-716 continues until each of the paths determined at step 710 has been considered, and the outer loop of steps 710-716 continues until each source node in the DAG 802 has been considered. In some embodiments, upon completion, flow continues to step 308 shown in FIG. 3A. In other embodiments, flow may continue directly, or at a later time, to any of steps 308, and/or 310 shown in FIG. 3B.

The grouped list of target network resources stored at the GRC database 214 provides multiple advantages as compared to conventional IaC IT infrastructure management applications. For example, using the GRC database 214, the GRC controller 212 may provide the administrators 103 or the IT infrastructure management application 205 with an IT infrastructure state history for the grouped network resources by retaining per-resource histories of state snapshots (i.e., for each network resource of a target network).

The GRC controller 212 may additionally provide the administrators 103 or the IT infrastructure management application 205 with a dynamic state of the IT infrastructure managed by the administrators 103. When the IT infrastructure state is needed, the GRC controller 212 may assemble the state dynamically from per-network resource state histories. Depending on the need, the administrators 103 or the IT infrastructure management application 205 may use the GRC database 214 to assemble state views from versions prior to the current ones, or even from different versions for different network resources. This advantageously enables new functionality, including:

i) Browsing the history of out-of-band (OOB) changes—i.e., changes not made using an IaC IT infrastructure management application to the IT infrastructure.

ii) "Detaching" a network resource or other IT infrastructure resource from a network specification without destroying it in the real world. That is, conventionally, an IaC IT infrastructure management application keeps a single copy of the network state which contains details about all of the network resources it has managed in the past. If a network resource is represented in the state data but has been removed from the specification, a conventional IaC IT infrastructure management application interprets this as an instruction to delete the network resource. If the administrators 103 instead intended to merely stop managing that network resource with the IaC IT infrastructure management application but not delete it, the change may be supported by not including the to-be-detached network resource in the state dynamically assembled for the IaC IT infrastructure management application by the GRC controller 212 when applying the specification.

iii) Allowing the administrators 103 to compare a given IT infrastructure specification against current reality, or a prior snapshot of reality. This enables a user working on edits to the specification to use a preview feature of an IaC IT infrastructure management application to see only the changes that will be caused as a direct result of their edits by asking the IaC IT infrastructure management application to generate the preview using a copy of the state from the time at which the user's draft was created (as opposed to the current version of the state, which might include unrelated changes from OOB drift or another user's specification update).

To elaborate, conventional IaC IT infrastructure management applications, such as TERRAFORM, locally cache a snapshot of network resources' current configurations/statuses in what's called a state file. For TERRAFORM, the state file includes a JSON blob for each network resource. The state file is updated (by querying the programmable IT infrastructure about each resource's current state) at various times, including right before updating the programmable IT infrastructure by applying an administrator's configuration file. This is how the conventional IaC IT infrastructure management application knows what changes to make in order to bring reality in line with the configuration—it updates the state thereof to match reality and then compares that state to the configuration.

In the context of IaC control and management of IT infrastructure, particularly in the context of network topology and resources, "configuration data" encompasses a variety of settings and parameters essential for the setup and coordination of network resources. This data includes device settings such as configurations for routers, switches, and firewalls, encompassing aspects like IP addresses, routing protocols, and port configurations. It may also describe the layout of a network topology, detailing the arrangement and interconnections between various network elements, including both physical and virtual links. The configuration data may additionally include settings for firewalls, access control lists, and network security groups. Still additionally, the configuration data may include the protocols used for network communication, including but not limited to TCP/IP, HTTP, and SSH, along with their specific configurations. Performance parameters addressing aspects such as bandwidth allocation and Quality of Service settings may also be included in the configuration data. In cloud environments, this includes configurations for virtual networks, subnets, and integrations with other cloud services. Service configurations may also be included in the configuration data. Such configuration data includes settings for network-dependent services such as DNS, DHCP, and VPNs.

In comparison to conventional IaC IT infrastructure management applications which typically store the state for all network resources for a given network configuration in a single state file, the GRC controller 212 breaks the state file apart, storing each network resource's state with its entry in the GRC database 214. The GRC controller 212 performs this operation whenever a network resource's GRC database entry is updated, as well as when the administrators 103 or the IT infrastructure management application 205 applies a configuration change. In the first example, when a network resource's GRC database entry is updated, the GRC controller 212 converts that entry into the IaC IT infrastructure management application's state format and stores it in the GRC database 214 as well. In the second example, after the administrators 103 or the IT infrastructure management application 205 applies a configuration change, the GRC controller 212 creates or updates an associated state file. The GRC controller 212 thereafter retrieves each network resource's state blob from the refreshed IaC state file and stores it in the GRC database 214.

In order to apply a configuration change to the IT infrastructure, an IaC IT infrastructure management application needs an up-to-date state file describing the current state of all network resources in the network configuration. Conventionally, IaC network configuration and state files include all network resources in an IT infrastructure environment. If a change is small and only affects a subset of the network resources in the IT infrastructure environment, this can be inefficient, because refreshing a large state file can be slow.

Therefore, rather than keeping one monolithic configuration file and a corresponding monolithic state file, the GRC controller 212 advantageously creates the configuration and state files dynamically with the minimum set of network resources needed for a given network configuration change.

Figure 9:
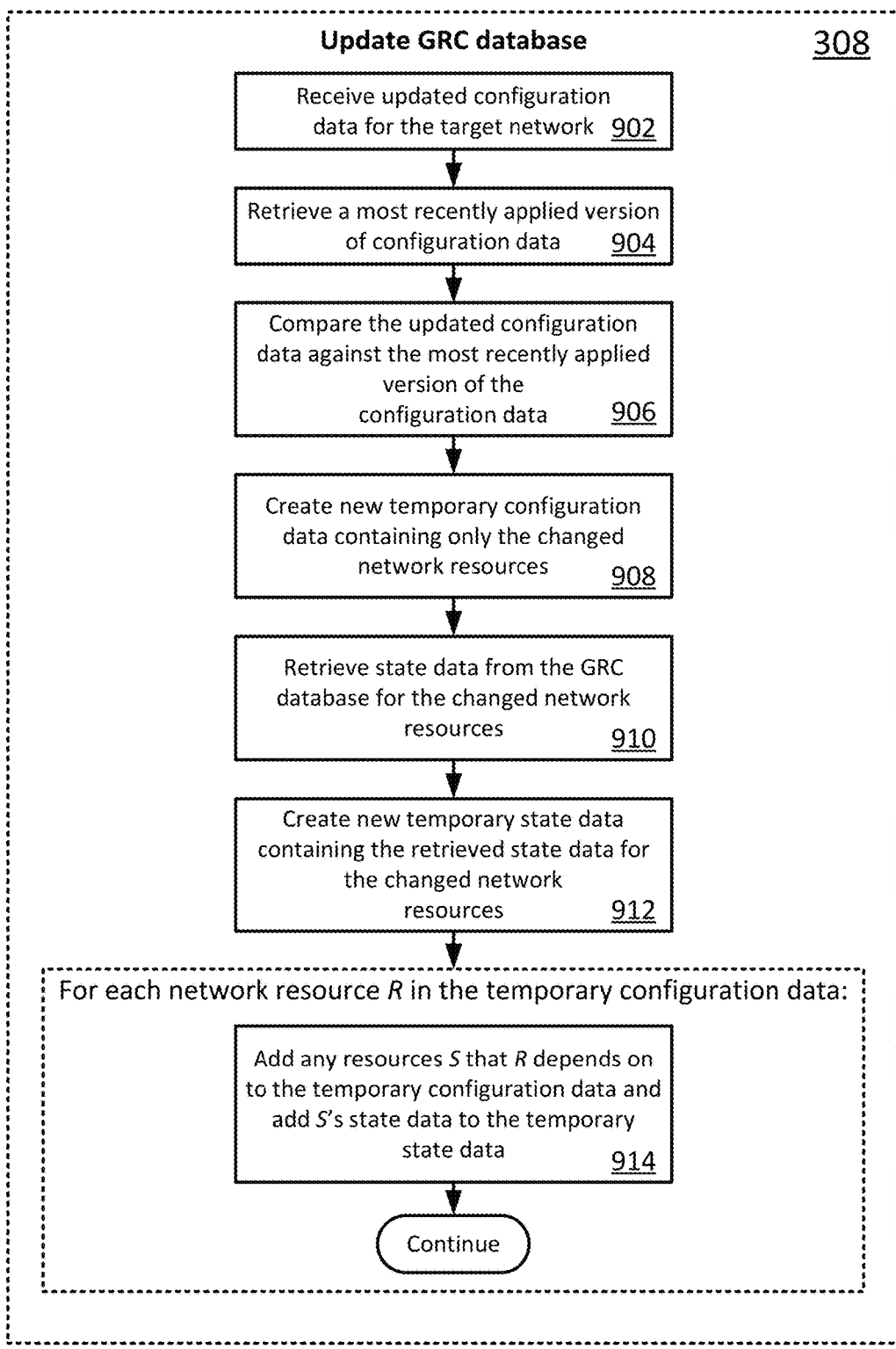
FIG. 9 illustrates a simplified portion of the processes introduced in FIGS. 3A-B, in accordance with some embodiments.

For example, FIG. 9 illustrates an example of a simplified portion of a process that implements updating the GRC database 214 at step 308 introduced in FIGS. 3A-B, in accordance with some embodiments. The particular steps, order of steps, and combination of steps are shown for illustrative and explanatory purposes only. Other embodiments can implement different particular steps, orders of steps, and combinations of steps to achieve similar functions or results At step 902, the GRC controller 212 receives updated configuration data for the target network from the administrators 103 or from the IaC IT infrastructure management application 205. At step 904, the GRC controller 212 retrieves the most recently applied version of the configuration data to the target network from the GRC database 214.

At step 906, the GRC controller 212 compares the updated configuration data against the most recently applied configuration data to identify any differences therebetween within the target network. Any network resources that have differences between the updated configuration data and the most recently applied configuration data are considered to be "changed" network resources. (This includes new network resources that were created in the update and network resources that were deleted in the update.)

At step 908, the GRC controller 212 creates new temporary configuration data containing only the changed network resources as determined at step 906 (i.e., excluding any unchanged network resources). At step 910, the GRC controller 212 retrieves state data from the GRC database 214 corresponding to the network resources that will be changed as determined at step 906. At step 912, the GRC controller 212 creates new temporary state data that contains the state data retrieved at step 910. Step 914 is then continued for each network resource R referenced in the temporary configuration data.

At step 914, the GRC controller 212 adds any network resource S that the network resource R depends on (e.g., as determined at step 306 of the process 300 illustrated in FIG. 7) to the temporary configuration data and adds configuration data for each of the network resources S to the temporary state data. Step 914 continues until no new network resources are added (there should be no missing dependencies).

In some embodiments, after all sub-steps of step 308 are completed, the process 300 shown in FIG. 3A may continue to step 310. In other embodiments, as shown in FIG. 3B, step 310 may be carried out any time after completion of step 304 or upon receiving or identifying a GRC database 214 created by another process. At step 310, a target network is updated (e.g., using a portal provided by the GRC controller 212 and/or the IT infrastructure management application 205), advantageously using the temporary configuration data and the temporary state data stored at the GRC database 214 rather than the full configuration and state data that a conventional IaC IT infrastructure management application would use.

For example, in a conventional IaC workflow, an administrator typically edits a declarative configuration and, when ready to apply the updated configuration, the IaC IT infrastructure management application may provide a preview of what actions it will take in order to make the IT infrastructure match the new configuration. The IaC IT infrastructure management application conventionally accomplishes this by refreshing its state file and comparing the configuration to the refreshed state. The list of proposed actions is referred to by some IaC IT infrastructure management applications as a "plan". The administrator may then review the list of proposed actions, i.e., the plan, and decide whether or not to continue.

Because the plan is generated by the conventional IaC IT infrastructure management application by diffing the configuration data against refreshed state data (i.e., the state updated with the latest information from reality), in some circumstances the plan might show an administrator actions that are not related to the configuration changes they've made and could be distracting if the administrator is trying to understand the impact of only their changes.

As disclosed herein, the GRC controller 212 advantageously combines a state history of the GRC database 214 with dynamically created state data. That is, rather than generating the plan using the current network state, the GRC controller 212 optionally dynamically assembles the state using a state history stored at the GRC database 214 and corresponding to the point in time when the administrator's configuration draft diverged from the applied configuration.

Figure 10B:
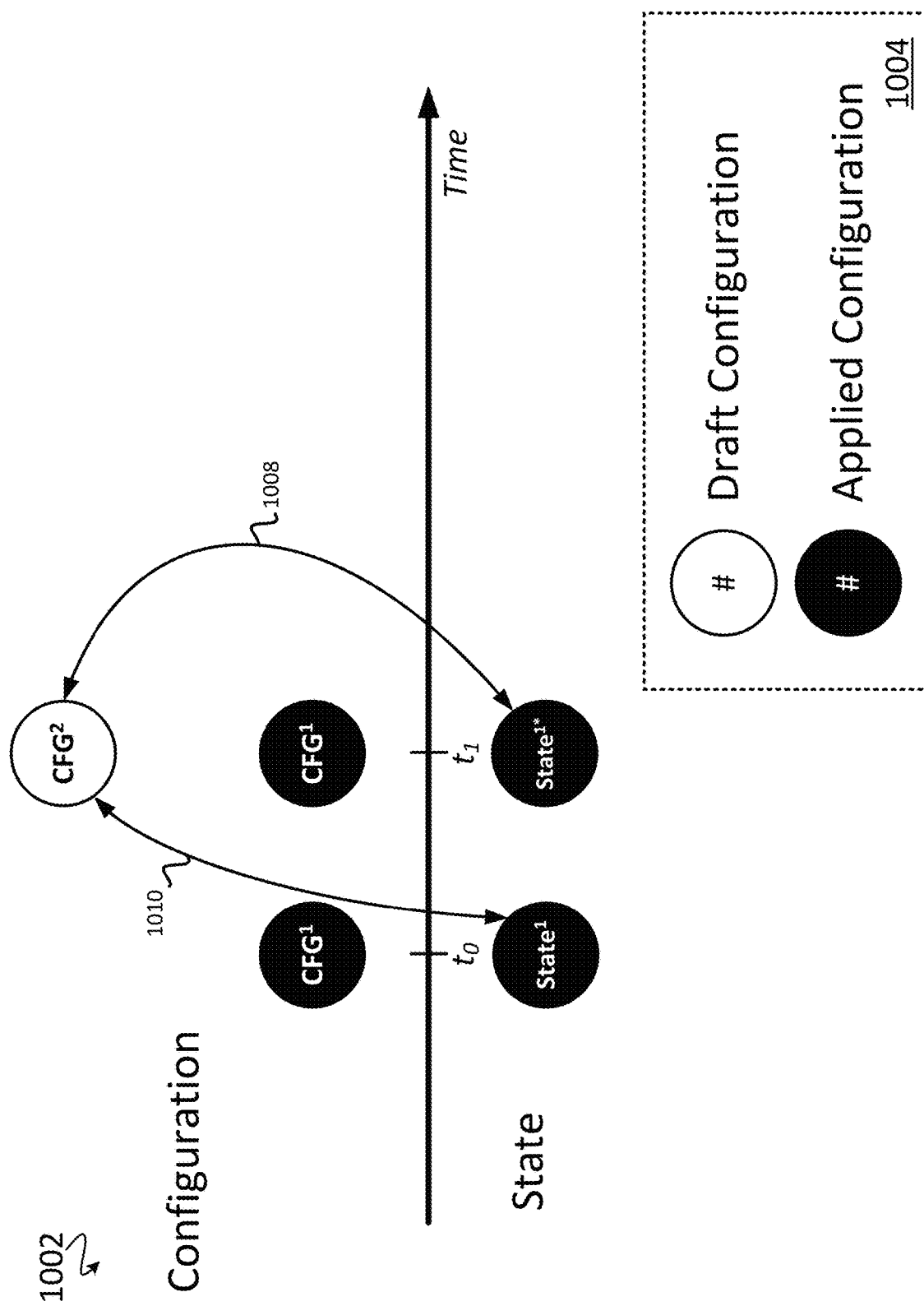

FIG. 10A-B illustrate a simplified example of changes to a network configuration and state of an IT infrastructure 1000 over time, in accordance with some embodiments. According to legend 1002, IT infrastructure configurations shown in white are draft configurations (i.e., planned), and IT infrastructure configurations and states shown in black are applied configurations and current states.

In some scenarios, multiple administrators of an IaC IT infrastructure management application might draft independent changes to the programmable IT infrastructure at the same (this is one of the benefits of using a declarative configuration). For example, with reference to FIG. 10A, at time $t_0$, the configuration and current state $State^1$ of the IT infrastructure 1000 are both in accordance with configuration data $CFG^1$. At time $t_1$, two administrators, A and B, create respective draft configurations $CFG^2$ and $CFG^3$ using applied configuration data $CFG^1$ as a starting point. At time $t_2$, the administrator A finishes their changes before the administrator B, and applies their draft configuration $CFG^2$ to the IT infrastructure 1000, resulting in an updated state $State^2$. At time $t_3$ the administrator B, who is still creating the configuration data $CFG^3$, may want to preview what actions within the IT infrastructure 1000 their draft configuration $CFG^3$ will cause based on the configuration state $State^1$ of the IT infrastructure 1000 (as indicated by line 1004). However, a conventional IaC IT infrastructure management application would instead generate a comparison of their draft configuration $CFG^3$ and the IT infrastructure 1000 configuration state $State^2$ (as indicated by line 1006). The comparison of draft configuration $CFG^3$ to applied configuration state $State^2$ results in a set of planned actions due not only to the administrator B's changes but also to the administrator A's applied changes (which are now reflected in the state).

To elaborate with a specific example, the configuration and state data $CFG^1$ at time $t_0$ may include a VPC 'X'. At time $t_1$, the administrator A adds a VPC 'Y' to the configuration data $CFG^2$, and the administrator B adds a VPC 'Z' to the configuration data $CFG^3$. However, because the administrator B has not yet incorporated the administrator A's changes into their draft configuration $CFG^3$ (they will need to before actually applying the changes, but at this stage, they are still working, and just want to see what changes they've made so far), the plan resulting from diffing the configuration data $CFG^3$ against the applied configuration state $State^2$ will include an action to delete VPC Y from the IT infrastructure 1000 (because VPC Y appears in the applied configuration state $State^2$ but not in the draft configuration data $CFG^3$). This action was unrelated to administrator B's changes. Administrator B only expects to see an action to create the VPC Z. By instead creating the plan by diffing (shown by the line 1004) the configuration data $CFG^3$ against the configuration state $State^1$ (using the state history stored at the GRC database 214), the resulting plan will advantageously only show changes related to administrator B's changes (i.e., only the action to create VPC Z).

A similar problem can occur even when only one administrator is using an IaC IT infrastructure management application. For example, with reference to FIG. 10B, at time $t_0$, the applied configuration and current state of the programmable IT infrastructure 1000 are both in accordance with configuration data $CFG^1$.

At time $t_1$, an administrator A creates draft configuration data $CFG^2$ based on the currently applied configuration data $CFG^1$ of $State^1$. However, since the time that the configuration data $CFG^1$ was applied, the programmable IT infrastructure was modified out-of-band (e.g., using the provider's portal rather than the IaC IT infrastructure management application), resulting in configuration state $State^{1*}$. These changes are discovered by the GRC controller 212, and the new state is updated in the GRC database 214.

Since the changes resulting in the configuration state $State^{1*}$ were not made using the IaC IT infrastructure management application, they are not part of the configuration data $CFG^1$ (similar to how the administrator A's changes weren't part of the administrator B's changes as described with reference to FIG. 10A). Thus, at time $t_1$, if the administrator A diffs the draft configuration data $CFG^2$ against the latest configuration state $State^{1*}$, as illustrated by line 1008, the plan will include actions that will revert the out-of-band changes. As before, these actions are unrelated to administrator A's changes and add clutter to the plan. Also as before, the GRC controller 212 advantageously instead optionally generates the plan by comparing the configuration data $CFG^2$ to the configuration state $State^1$ (the historic state from the time the configuration data $CFG^2$ was created, retrieved from the GRC database 214), as illustrated by line 1010.

Figure 11:
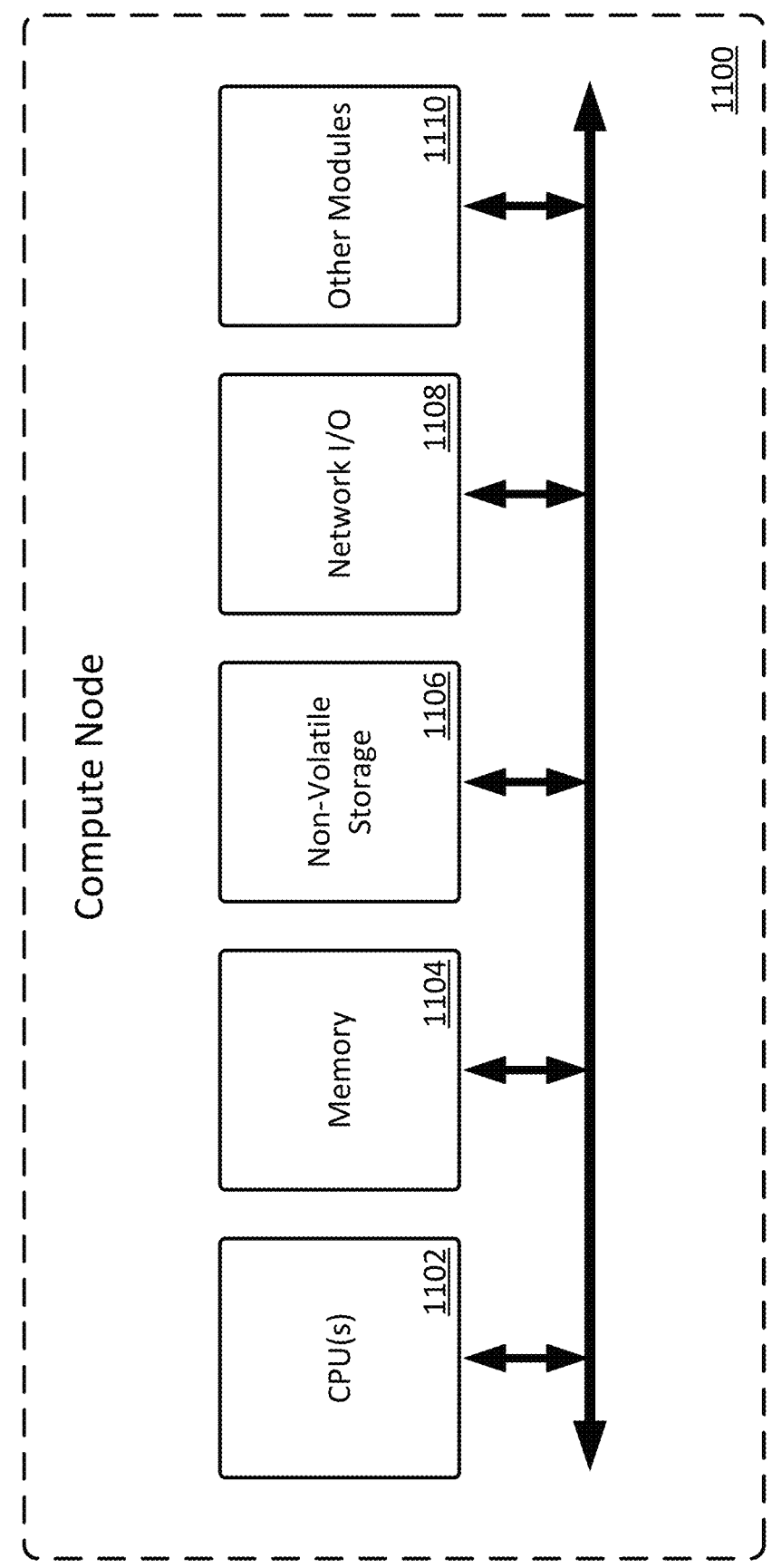
FIG. 11 illustrates an example compute node, in accordance with some embodiments.

FIG. 11 illustrates an example compute node 1100, in accordance with some embodiments. In some embodiments, the one or more compute nodes 210 are the same as or similar to the compute node 1100. The compute node 1100 generally includes one or more CPUs 1102, a memory module 1104 (e.g., RAM), a non-volatile data storage module 1106 (e.g., a hard drive or array of hard drives), a network I/O module 1108 (e.g., a network interface card (NIC) and/or a top-of-rack interface), and other modules 1110 such as user I/O, wireless communication modules, optical communication modules, system diagnostic or monitoring modules, or other modules. In some embodiments, the compute node 1100 is configured to perform all or a portion of the process steps discussed with reference to the processes disclosed herein. The non-volatile data storage module 1106, thus, stores data and several programs for some or all of the above-described functions and process steps, among others. The data and programs are loaded into the memory module 1104, so that the one or more CPUs 1102 (in conjunction with the memory module 1104) can perform some or all of the above-described functions and process steps, among others. In some embodiments, the CPUs 1102 are shared or dedicated CPUs. These CPUs could perform a single network function, perform multiple network functions, or perform other tasks in addition to performing network functions. Examples of the CPUs 1102 include microprocessors, digital signal processors, microcontrollers, and dedicated hardware such as ASICs (Application Specific Integrated Circuits) and FPGAs (Field Programmable Gate Arrays).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:
    receiving, at a Global Resource Catalog (GRC) controller, credentials for one or more target networks within a distributed cloud network;
    for each target network, using, by the GRC controller, a respective network access methodology associated with that target network to identify and store a first set of target network resources associated with that network at a GRC database;
    linking or grouping, by the GRC controller, a second set of target network resources of the first set of target network resources in the GRC database based on target network resource dependencies determined by the GRC controller;
    updating, by the GRC controller, the second set of target network resources in the GRC database based on a received event or at a scheduled interval; and
    updating the distributed cloud network based on the second set of target network resources stored at the GRC database.

2. The method of claim 1, wherein identifying and storing a first set of target network resources comprises:
    for each target network of the one or more target networks:
        identifying, by the GRC controller, a network resource access Application Programming Interface (API);
        retrieving, by the GRC controller, a data representation of each target network resource associated with the target network using the network access API in accordance with a first network resource access API methodology; and
        for each retrieved target network resource:
        determining, by the GRC controller, if the retrieved data representation comprises target configuration data;
        upon determining, by the GRC controller, that the retrieved data representation does not comprise the target configuration data, retrieving, by the GRC controller, the target configuration data for the target network resource using the network access API in accordance with a second network resource access API methodology; and
        storing, by the GRC controller, the data representation and associated target configuration data for each target network resource at the GRC database.

3. The method of claim 1, wherein identifying and storing a first set of target network resources comprises:

for each target network of the one or more target networks:
retrieving, by the GRC controller, a data representation of each target network resource associated with the target network in accordance with an Infrastructure as Code (IaC) methodology; and
for each retrieved target network resource:
retrieving, by the GRC controller, target configuration data for the target network resource using the IaC methodology; and
storing, by the GRC controller, the data representation and associated configuration data for each target network resource at the GRC database.

4. The method of claim 1, wherein linking or grouping the second set of target network resources comprises:
for each first target network resource of the first set of target network resources:
identifying, by the GRC controller, a set of properties for the first target network resource; and
for each remaining second target network resource in the first set of target network resources:
identifying, by the GRC controller, a set of properties for the second target network resource;
comparing, by the GRC controller, each first property of the first target network resource to each second property of the second network resource;
upon determining, by the GRC controller, that a potential link is defined in the GRC database between the first property and the second property, determining, by the GRC controller, whether one or more first values of the first property match one or more second values of the second property; and
upon determining that the one or more first values match one or more second values, annotating, in the GRC database, the first property with an identifier of the second property, and annotating, in the GRC database, the second property with an identifier of the first property.

5. The method of claim 4, further comprising:
upon determining, by the GRC controller, that the one or more first values do not match the one or more second values, removing, from the GRC database, an annotation linking the first property to the second property and an annotation linking the second property to the first property.

6. The method of claim 1, wherein linking or grouping the second set of target network resources comprises:
identifying, by the GRC controller, one or more target networks or containers;
initializing, by the GRC controller, an empty list of target network resources;
creating, by the GRC controller, a dummy source node and a dummy sink node within a directed acyclic graph (DAG);
adding, by the GRC controller, a node for each target network resource to the DAG, the nodes comprising source nodes, sink nodes, and intermediate nodes; and
for each source node in the DAG:
performing, by the GRC controller, a depth-first search from that source node to the dummy sink node to determine a first set of paths; and
for each path in the first set of paths:

determining, by the GRC controller, a second set of paths from the source node to any sink node that is not of a network different from the target network; and
appending, by the GRC controller, intermediate nodes in the first set of paths and the second set of paths to the list of target network resources.

7. The method of claim 1, wherein updating the second set of target network resources in the GRC database comprises:
receiving, by the GRC controller, updated configuration data for the target network;
retrieving, by the GRC controller, a most recent version of configuration data applied to the target network;
comparing, by the GRC controller, the updated configuration data against the most recently applied version of the configuration data to determine one or more changed network resources;
creating, by the GRC controller, new temporary configuration data comprising the one or more changed network resources;
retrieving, by the GRC controller, state data from the GRC database that is associated with the changed network resources;
creating, by the GRC controller, new temporary state data comprising the retrieved state data for the one or more changed network resources; and
for each first network resource in the temporary configuration data:
adding, by the GRC controller, any second network resource that the first network resource depends on to the temporary configuration data and adding state data of the second network resource to the temporary state data.

8. The method of claim 7, wherein updating the distributed cloud network comprises:
previewing, by an administrator, a planned change to the distributed cloud network generated using the temporary configuration and temporary state data; and
updating, by the administrator, the distributed cloud network based on the previewed change.

9. A non-transitory computer-readable medium storing instructions for executing a computer-implemented method, the computer-implemented method comprising:
receiving, at a Global Resource Catalog (GRC) controller, credentials for one or more target networks within a distributed cloud network;
for each target network, using, by the GRC controller, a respective network access methodology associated with that target network to identify and store a first set of target network resources associated with that network at a GRC database;
linking or grouping, by the GRC controller, a second set of target network resources of the first set of target network resources in the GRC database based on target network resource dependencies determined by the GRC controller;
updating, by the GRC controller, the second set of target network resources in the GRC database based on a received event or at a scheduled interval; and
updating the distributed cloud network based on the second set of target network resources stored at the GRC database.

10. The non-transitory computer-readable medium of claim 9, wherein identifying and storing a first set of target network resources comprises:
for each target network of the one or more target networks:

identifying, by the GRC controller, a network resource access Application Programming Interface (API);

retrieving, by the GRC controller, a data representation of each target network resource associated with the target network using the network access API in accordance with a first network resource access API methodology; and for each retrieved target network resource:

determining, by the GRC controller, if the retrieved data representation comprises target configuration data;

upon determining, by the GRC controller, that the retrieved data representation does not comprise the target configuration data, retrieving, by the GRC controller, the target configuration data for the target network resource using the network access API in accordance with a second network resource access API methodology; and storing, by the GRC controller, the data representation and associated target configuration data for each target network resource at the GRC database.

11. The non-transitory computer-readable medium of claim 9, wherein identifying and storing a first set of target network resources comprises:

for each target network of the one or more target networks:

retrieving, by the GRC controller, a data representation of each target network resource associated with the target network in accordance with an Infrastructure as Code (IaC) methodology; and for each retrieved target network resource:

retrieving, by the GRC controller, target configuration data for the target network resource using the IaC methodology; and storing, by the GRC controller, the data representation and associated configuration data for each target network resource at the GRC database.

12. The non-transitory computer-readable medium of claim 9, wherein linking or grouping the second set of target network resources comprises:

for each first target network resource of the first set of target network resources:

identifying, by the GRC controller, a set of properties for the first target network resource; and for each remaining second target network resource in the first set of target network resources:

identifying, by the GRC controller, a set of properties for the second target network resource;

comparing, by the GRC controller, each first property of the first target network resource to each second property of the second network resource;

upon determining, by the GRC controller, that a potential link is defined in the GRC database between the first property and the second property, determining, by the GRC controller, whether one or more first values of the first property match one or more second values of the second property; and upon determining that the one or more first values match one or more second values, annotating, in the GRC database, the first property with an identifier of the second property, and annotating, in the GRC database, the second property with an identifier of the first property.

13. The non-transitory computer-readable medium of claim 12, the computer-implemented method further comprising:

upon determining, by the GRC controller, that the one or more first values do not match the one or more second values, removing, from the GRC database, an annotation linking the first property to the second property and an annotation linking the second property to the first property.

14. The non-transitory computer-readable medium of claim 9, wherein linking or grouping the second set of target network resources comprises:

identifying, by the GRC controller, one or more target networks or containers;

initializing, by the GRC controller, an empty list of target network resources;

creating, by the GRC controller, a dummy source node and a dummy sink node within a directed acyclic graph (DAG);

adding, by the GRC controller, a node for each target network resource to the DAG, the nodes comprising source nodes, sink nodes, and intermediate nodes; and for each source node in the DAG:

performing, by the GRC controller, a depth-first search from that source node to the dummy sink node to determine a first set of paths; and for each path in the first set of paths:

determining, by the GRC controller, a second set of paths from the source node to any sink node that is not of a network different from the target network; and appending, by the GRC controller, intermediate nodes in the first set of paths and the second set of paths to the list of target network resources.

15. The non-transitory computer-readable medium of claim 9, wherein updating the second set of target network resources in the GRC database comprises:

receiving, by the GRC controller, updated configuration data for the target network;

retrieving, by the GRC controller, a most recent version of configuration data applied to the target network;

comparing, by the GRC controller, the updated configuration data against the most recently applied version of the configuration data to determine one or more changed network resources;

creating, by the GRC controller, new temporary configuration data comprising the one or more changed network resources;

retrieving, by the GRC controller, state data from the GRC database that is associated with the changed network resources;

creating, by the GRC controller, new temporary state data comprising the retrieved state data for the one or more changed network resources; and for each first network resource in the temporary configuration data:

adding, by the GRC controller, any second network resource that the first network resource depends on to the temporary configuration data and adding state data of the second network resource to the temporary state data.

16. The non-transitory computer-readable medium of claim 15, wherein updating the distributed cloud network comprises:

previewing, by an administrator, a planned change to the distributed cloud network generated using the temporary configuration and temporary state data; and updating, by the administrator, the distributed cloud network based on the previewed change.

17. A method, comprising:

identifying, at a Global Resource Catalog (GRC) controller, a GRC database that includes data associated with a first set of target network resources of a distributed cloud network; and linking or grouping, by the GRC controller, a second set of target network resources within the first set of target network resources based on target network resource dependencies determined by the GRC controller, the linking comprising:

for each first target network resource of the first set of target network resources:

identifying, by the GRC controller, a set of properties for the first target network resource; and for each remaining second target network resource in the first set of target network resources:

identifying, by the GRC controller, a set of properties for the second target network resource;

comparing, by the GRC controller, each first property of the first target network resource to each second property of the second network resource;

upon determining, by the GRC controller, that a potential link is defined in the GRC database between the first property and the second property, determining, by the GRC controller, whether one or more first values of the first property match one or more second values of the second property; and upon determining that the one or more first values match one or more second values, annotating, in the GRC database, the first property with an identifier of the second property, and annotating, in the GRC database, the second property with an identifier of the first property; and updating the distributed cloud network based on the second set of target network resources stored at the GRC database.

18. The method of claim 17, further comprising:

upon determining, by the GRC controller that the one or more first values do not match the one or more second values, removing, from the GRC database, an annotation linking the first property to the second property and an annotation linking the second property to the first property.

19. The method of claim 17, wherein:

the identified GRC database was generated by the GRC controller, the generation comprising:

for each target network of one or more target networks:

identifying, by the GRC controller, a network resource access Application Programming Interface (API);

retrieving, by the GRC controller, a data representation of each target network resource associated with the target network using the network access API in accordance with a first network resource access API methodology; and for each retrieved target network resource:

determining, by the GRC controller, if the retrieved data representation comprises target configuration data;

upon determining, by the GRC controller, that the retrieved data representation does not comprise the target configuration data, retrieving, by the GRC controller, the target configuration data for the target network resource using the network access API in accordance with a second network resource access API methodology; and storing, by the GRC controller, the data representation and associated target configuration data for each target network resource at the GRC database.

20. The method of claim 17, wherein:

the identified GRC database was generated by the GRC controller, the generation comprising:

for each target network of one or more target networks:

retrieving, by the GRC controller, a data representation of each target network resource associated with the target network in accordance with an Infrastructure as Code (IaC) methodology; and for each retrieved target network resource:

retrieving, by the GRC controller, target configuration data for the target network resource using the IaC methodology; and storing, by the GRC controller, the data representation and associated configuration data for each target network resource at the GRC database.

* * * * *